US012713215B2

(12) United States Patent
Pateromichelakis

(10) Patent No.: US 12,713,215 B2
(45) Date of Patent: Aug. 18, 2026

(54) APPLICATION REQUIREMENTS FOR VEHICLE-TO-EVERYTHING APPLICATIONS

(71) Applicant: Lenovo (Singapore) Pte. Ltd., New Tech Park (SG)

(72) Inventor: Emmanouil Pateromichelakis, Viersen (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/922,313

(22) PCT Filed: Apr. 29, 2020

(86) PCT No.: PCT/EP2020/061927
§ 371 (c)(1),
(2) Date: Oct. 28, 2022

(87) PCT Pub. No.: WO2021/219215
PCT Pub. Date: Nov. 4, 2021

(65) Prior Publication Data
US 2023/0188964 A1 Jun. 15, 2023

(51) Int. Cl.
*G06F 15/16* (2006.01)
*H04L 67/00* (2022.01)
(Continued)

(52) U.S. Cl.
CPC ............... *H04W 4/50* (2018.02); *H04L 67/34* (2013.01); *H04W 4/44* (2018.02); *H04W 84/042* (2013.01)

(58) Field of Classification Search
CPC ....... H04W 4/50; H04W 4/44; H04W 84/042; H04L 67/34
(Continued)

(56) References Cited

U.S. PATENT DOCUMENTS 8,848,608 B1 * 9/2014 Addepalli ............... H04W 4/40 370/401
10,575,304 B2 * 2/2020 Faurie ..................... H04W 4/70
(Continued)

FOREIGN PATENT DOCUMENTS

WO 2019161925 A1 2/2018
WO 2019104280 A1 5/2019
(Continued)

OTHER PUBLICATIONS

PCT/EP2020/061927, "Notification of Transmittal of the International Search Report and the Written Opinion of the International Searching authority, or the Declaration", International Searching Authority, Jan. 20, 2021, pp. 1-20.
(Continued)

*Primary Examiner* — Bharat Barot
(74) *Attorney, Agent, or Firm* — Kunzler Needham Hilton

(57) ABSTRACT

Apparatuses, methods, and systems are disclosed for obtaining application requirements for vehicle-to-everything applications. One method (900) includes obtaining (902) at least one application requirement from at least one vehicle-to-everything application. The method (900) includes determining (904) at least one provisioning parameter for a plurality of vehicle-to-everything user equipments based on the at least one application requirement, wherein the plurality of vehicle-to-everything user equipments are serviced by a plurality of communication networks. The method (900) includes transmitting (906) the at least one provisioning parameter to at least one vehicle-to-everything user equipment of the plurality of vehicle-to-everything user equipments, at least one communication network of the plurality of communication networks, or some combination thereof.

18 Claims, 10 Drawing Sheets

(51) Int. Cl.
*H04W 4/44* (2018.01)
*H04W 4/50* (2018.01)
*H04W 84/04* (2009.01)

(58) Field of Classification Search
USPC .................................................. 709/217–219
See application file for complete search history.

(56) References Cited

U.S. PATENT DOCUMENTS

| | | | | |
|---|---|---|---|---|
| 10,965,479 | B2 * | 3/2021 | Atarius | H04W 84/005 |
| 11,477,623 | B2 * | 10/2022 | Perras | H04W 4/50 |
| 11,943,663 | B2 * | 3/2024 | Kousaridas | H04W 28/24 |
| 12,004,111 | B2 * | 6/2024 | Shan | H04W 4/40 |
| 2018/0213376 | A1 | 7/2018 | Pinheiro et al. | |
| 2019/0313221 | A1 | 10/2019 | Lee et al. | |
| 2020/0413235 | A1 * | 12/2020 | Pateromichelakis | H04W 4/44 |
| 2021/0058497 | A1 * | 2/2021 | Pan | H04W 4/44 |
| 2021/0219116 | A1 | 7/2021 | Perras et al. | |
| 2021/0227619 | A1 | 7/2021 | Balasubramanian et al. | |
| 2021/0314916 | A1 * | 10/2021 | Fouad | H04W 72/02 |
| 2022/0007161 | A1 * | 1/2022 | Shan | H04W 4/50 |
| 2022/0110018 | A1 * | 4/2022 | Jha | H04W 4/40 |
| 2022/0158776 | A1 | 5/2022 | Kang et al. | |
| 2022/0159527 | A1 * | 5/2022 | Lee | H04W 4/50 |
| 2022/0255643 | A1 * | 8/2022 | Zhao | H04W 4/40 |
| 2022/0295353 | A1 * | 9/2022 | Gautam | H04W 4/50 |
| 2023/0034755 | A1 | 2/2023 | Vukadinovic et al. | |

FOREIGN PATENT DOCUMENTS

| | | | |
|---|---|---|---|
| WO | 2019222654 | A1 | 11/2019 |
| WO | 2020052775 | A1 | 3/2020 |

OTHER PUBLICATIONS

5GAA, Cellular V2X Conclusions based on Evaluation of Available Architectural Options, White Paper, Feb. 20, 2019, pp. 1-31.

3GPP, "3rd Generation Partnership Project; Technical Specification Group Services and System Aspects; Enhancement of 3GPP support for V2X scenarios; Stage 1 (Release 16)", 3GPP TS 22.186 V16.2.0, Jun. 2019, pp. 1-18.

3GPP, "3rd Generation Partnership Project; Technical Specification Group Services and System Aspects; Architecture enhancements for 5G System (5GS) to support Vehicle-to-Everything (V2X) services (Release 16)", 3GPP TS 23.287 V16.2.0, Mar. 2020, pp. 1-53.

3GPP, "3rd Generation Partnership Project; Technical Specification Group Services and System Aspects; Service Enabler Architecture Layer for Verticals (SEAL); Functional architecture and information flows; (Release 16)", 3GPP TS 23.434 V16.3.0, Mar. 2020, pp. 1-120.

3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, pp. 1-430.

3GPP, "3rd Generation Partnership Project; Technical Specification Group Services and System Aspects; Procedures for the 5G System (5GS); Stage 2 (Release 16)", 3GPP TS 23.502 V16.4.0, Mar. 2020, pp. 1-582.

3GPP, "3rd Generation Partnership Project; Technical Specification Group Services and System Aspects; Architecture enhancements to facilitate communications with packet data networks and applications (Release 16)", 3GPP TS 23.682 V16.6.0, Mar. 2020, pp. 1-134.

3GPP, "3rd Generation Partnership Project; Technical Specification Group Services and System Aspects; Study on enhancements to application layer support for V2X services; (Release 17)", 3GPP TR 23.764 V0.5.0, Feb. 2020, pp. 1-21.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.9.0, Mar. 2020, pp. 1-964.

3GPP, "3rd Generation Partnership Project; Technical Specification Group Radio Access Network; NR; Radio Resource Control (RRC) protocol specification (Release 15)", 3GPP TS 38.331 V15.9.0, Mar. 2020, pp. 1-536.

U.S. Appl. No. 17/922,326, "Office Action Summary", Jul. 5, 2023, pp. 1-33.

3GPP, "3rd Generation Partnership Project; Technical Specification Group Radio Access Network; NR; Study on NR Vehicle-to-Everything (V2X) (Release 16)", 3GPP TR 38.885 V16.0.0, Mar. 2019, pp. 1-122.

3GPP "3rd Generation Partnership Project; Technical Specification Group Services and System Aspects; Study on architecture enhancements for EPS and 5G System to support advanced V2X services (Release 16)", 3GPP TR 23.786 V1.1.0, Jan. 2019, pp. 1-111.

U.S. Appl. No. 17/922,326, "Office Action Summary", United States Patent and Trademark Office, Oct. 30, 2024, pp. 1-20.

3GPP "3rd Generation Partnership Project; Technical Specification Group Services and System Aspects; Enhancement of 3GPP support for V2X scenarios; Stage 1 (Release 15)", 3GPP TS 22.186 V15.2.0, Sep. 2017, pp. 1-16.

U.S. Appl. No. 17/922,326, "Office Action Summary", US Patent and Trademark Office, Feb. 11, 2025, pp. 1-25.

U.S. Appl. No. 17/922,326, "Office Action Summary", US Patent and Trademark Office, Aug. 6, 2025, pp. 1-25.

* cited by examiner

APPLICATION REQUIREMENTS FOR VEHICLE-TO-EVERYTHING APPLICATIONS

FIELD

The subject matter disclosed herein relates generally to wireless communications and more particularly relates to application requirements for vehicle-to-everything applications.

BACKGROUND

The following abbreviations are herewith defined, at least some of which are referred to within the following description: Third Generation Partnership Project ("3GPP"), 5$^{th}$ Generation ("5G"), 5G System ("5GS"), 5G QoS Identifiers ("5QIs"), Authentication, Authorization, and Accounting ("AAA"), Positive-Acknowledgment ("ACK"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Access Stratum ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Channel Busy Ratio ("CBR"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Category of Requirements ("CoR"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Enhanced V2X ("eV2X"), Extensible Authentication Protocol ("EAP"), Effective Isotropic Radiated Power ("EIRP"), Evolved Packet System ("EPS"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Guaranteed Bit Rate ("GBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), Generic Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Intelligent Transportation Systems ("ITS"), Key Performance Indicator ("KPI"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Level of Automation ("LoA"), Line of Sight ("LOS"), Long Term Evolution ("LTE"), LIE Vehicle ("LTE-V"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Mobile Edge Computing ("MEC"), Master Information Block ("MIB"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Exposure Function/Service Capability Exposure Function ("NEF/SCEF"), Network Function ("NE"), Non-LOS ("NLOS"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy and Charging Rules Function ("PCRF"), Policy Control Function ("PCF"), Physical Cell Identity ("PCI"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Prose Per Packet Priority ("PPPP"), Prose Per Packet Reliability ("PPPR"), PC5 5QI ("PQIs"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAND"), Random Access Response ("RAR"), Resource Block Assignment ("RBA"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Service Capability Exposure Function ("SCEF"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Service Enabler Architecture Layer ("SEAL"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SNIT"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TM"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Everything ("V2X"), V2X Control Function ("V2XCF"), V2X UE (e.g., a UE capable of vehicular communication using 3GPP protocols), V2X Application Enabler ("VAE"), Visiting AMF ("vAMF"), Visiting NSSF ("vNSSF"), Visiting PLMN ("VPLMN"), Wide Area Network ("WAN"), and Worldwide Interoperability for Microwave Access ("WiMAX").

In certain wireless communications networks, vehicle-to-everything applications may be used.

BRIEF SUMMARY

Methods for obtaining application requirements for vehicle-to-everything applications are disclosed. Apparatuses and systems also perform the functions of the methods. One embodiment of a method includes obtaining at least one application requirement from at least one vehicle-to-everything application. In some embodiments, the method includes determining at least one provisioning parameter for a plurality of vehicle-to-everything user equipments based on the at least one application requirement, wherein the plurality of vehicle-to-everything user equipments are serviced by a plurality of communication networks. In various embodiments, the method includes transmitting the at least one provisioning parameter to at least one vehicle-to-everything user equipment of the plurality of vehicle-to-everything user equipments, at least one communication network of the plurality of communication networks, or some combination thereof.

One apparatus for obtaining application requirements for vehicle-to-everything applications includes a processor that: obtains at least one application requirement from at least one vehicle-to-everything application; and determines at least one provisioning parameter for a plurality of vehicle-to-everything user equipments based on the at least one application requirement, wherein the plurality of vehicle-to-everything user equipments are serviced by a plurality of communication networks. In certain embodiments, the apparatus includes a transmitter that transmits the at least one provisioning parameter to at least one vehicle-to-everything user equipment of the plurality of vehicle-to-everything user equipments, at least one communication network of the plurality of communication networks, or some combination thereof.

In certain embodiments, a method for receiving application requirements for vehicle-to-everything applications includes receiving at least one application requirement from at least one vehicle-to-everything application. In some embodiments, the method includes receiving at least one provisioning parameter, wherein the at least one provisioning parameter is determined for a plurality of vehicle-to-everything user equipments based on the at least one application requirement, and the plurality of vehicle-to-everything user equipments are serviced by a plurality of communication networks.

In various embodiments, an apparatus for receiving application requirements for vehicle-to-everything applications includes a receiver that: receives at least one application requirement from at least one vehicle-to-everything application; and receives at least one provisioning parameter, wherein the at least one provisioning parameter is determined for a plurality of vehicle-to-everything user equipments based on the at least one application requirement, and the plurality of vehicle-to-everything user equipments are serviced by a plurality of communication networks.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
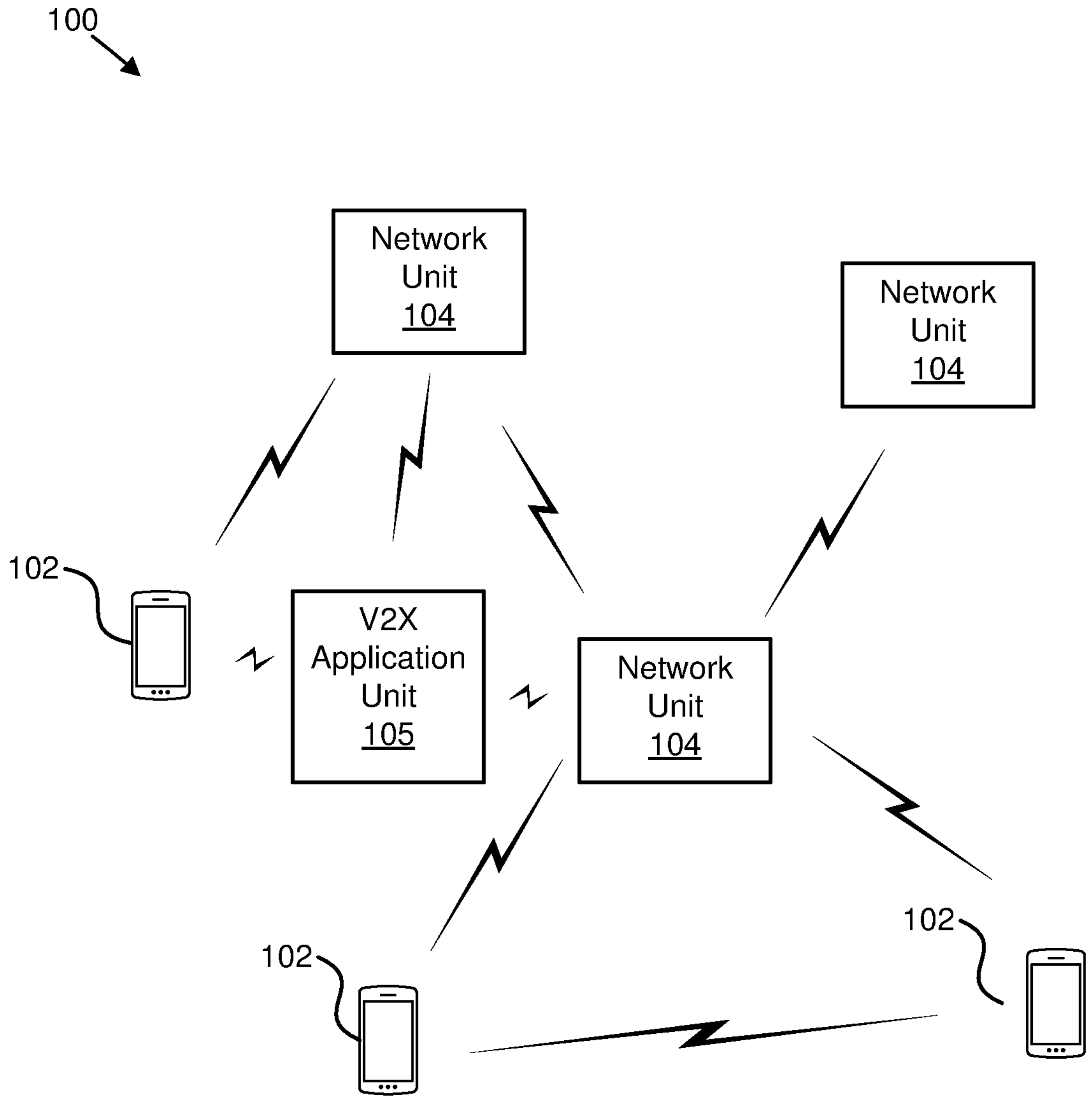
FIG. 1 is a schematic block diagram illustrating one embodiment of a wireless communication system for obtaining and/or receiving application requirements for vehicle-to-everything applications.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for obtaining and/or receiving application requirements for vehicle-to-everything applications. In one embodiment, the wireless communication system 100 includes remote units 102, network units 104, and one or more V2X application units 105. Even though a specific number of remote units 102, network units 104, and V2X application units 105 are depicted in FIG. 1, one of skill in the art will recognize that any number of remote units 102, network units 104, and V2X application units 105 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain. In certain embodiments, the V2X application unit 105 may provide application requirements to the remote unit 102 and/or the network unit 104.

In various embodiments, a network unit 104 may obtain at least one application requirement from at least one vehicle-to-everything application. In some embodiments, the network unit 104 may determine at least one provisioning parameter for a plurality of vehicle-to-everything user equipments based on the at least one application requirement, wherein the plurality of vehicle-to-everything user equipments are serviced by a plurality of communication networks. In various embodiments, the network unit 104 may transmit the at least one provisioning parameter to at least one vehicle-to-everything user equipment of the plurality of vehicle-to-everything user equipments, at least one communication network of the plurality of communication networks, or some combination thereof. Accordingly, the network unit 104 may be used for obtaining application requirements for vehicle-to-everything applications.

In certain embodiments, a remote unit 102 may receive at least one application requirement from at least one vehicle-to-everything application. In some embodiments, the remote unit 102 may receive at least one provisioning parameter, wherein the at least one provisioning parameter is determined for a plurality of vehicle-to-everything user equipments based on the at least one application requirement, and the plurality of vehicle-to-everything user equipments are serviced by a plurality of communication networks. Accordingly, the remote unit 102 may be used for receiving application requirements for vehicle-to-everything applications.

Figure 2:
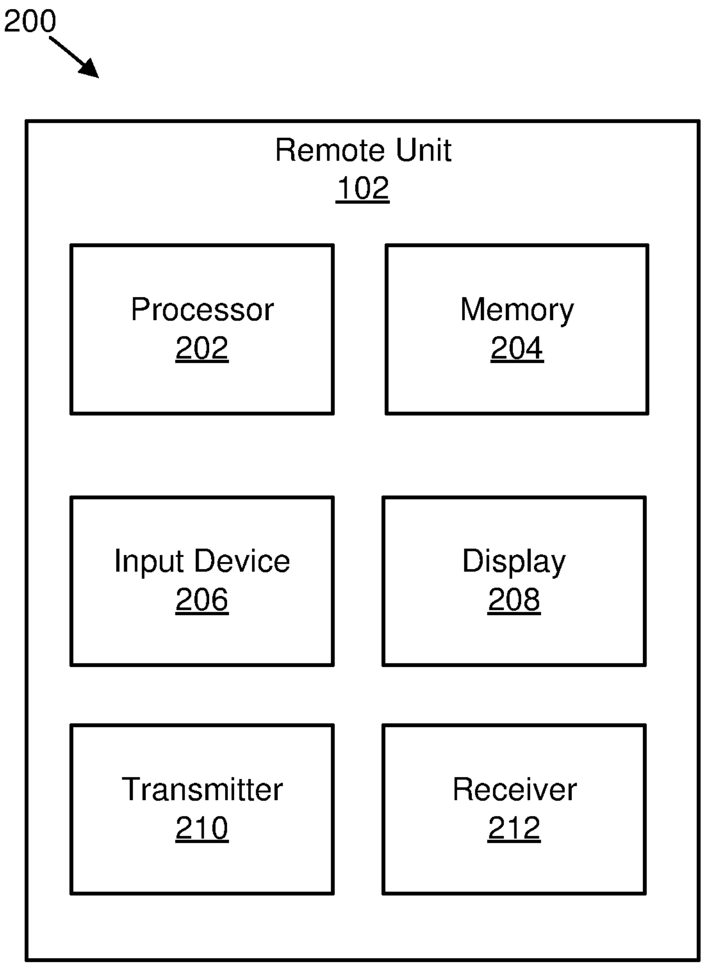
FIG. 2 is a schematic block diagram illustrating one embodiment of an apparatus that may be used for receiving application requirements for vehicle-to-everything applications.

FIG. 2 depicts one embodiment of an apparatus 200 that may be used for receiving application requirements for vehicle-to-everything applications. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RANI ("DRAM"), synchronous dynamic RANI ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212: receives at least one application requirement from at least one vehicle-to-everything application; and receives at least one provisioning parameter, wherein the at least one provisioning parameter is determined for a plurality of vehicle-to-everything user equipments based on the at least one application requirement, and the plurality of vehicle-to-everything user equipments are serviced by a plurality of communication networks.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
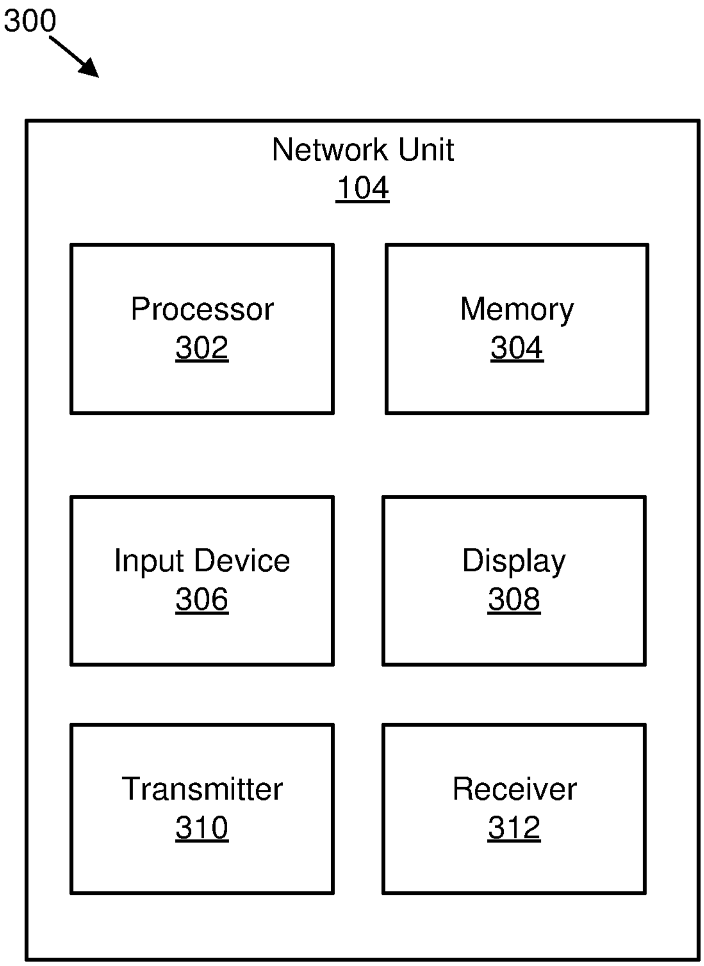
FIG. 3 is a schematic block diagram illustrating one embodiment of an apparatus that may be used for obtaining application requirements for vehicle-to-everything applications.

FIG. 3 depicts one embodiment of an apparatus 300 that may be used for obtaining application requirements for vehicle-to-everything applications. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the processor 302 may: obtain at least one application requirement from at least one vehicle-to-everything application; and determine at least one provisioning parameter for a plurality of vehicle-to-everything user equipments based on the at least one application requirement, wherein the plurality of vehicle-to-everything user equipments are serviced by a plurality of communication networks. In some embodiments, the transmitter 310 transmits the at least one provisioning parameter to at least one vehicle-to-everything user equipment of the plurality of vehicle-to-everything user equipments, at least one communication network of the plurality of communication networks, or some combination thereof. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, there may be PC5 parameter provisioning and configuration to a group of V2X users that directly communicate via sidelink communication. In such embodiments, one or more group members of the group of V2X users are registered to different PLMNs.

In various embodiments, V2X services may have ultra-reliable and low latency characteristics and/or may require high data rates due to high expected payloads. CoR and/or LoA may be used, may reflect technological functional aspects, and/or may affect system performance requirements for different V2X configurations.

As may be appreciated, CoRs may include: general aspects; vehicle platooning; advanced driving; extended sensors; and/or remote driving. Moreover, LoAs may include: no automation; driver assistance; partial automation; conditional automation; high automation; and/or full automation.

In certain embodimnets, each CoR scenario and/or each degree of LoA, requirement may be specified in terms of: payload (e.g., bytes); transmission rate (e.g., message/sec); maximum end-to-end latency (e.g., ms); reliability (e.g., %); data rate (e.g., Mbps); and/or minimum required communication range (e.g., meters). In some embodiments, V2X scenarios may be delay and reliability critical while a rate (e.g., and thus a resource) requirement may vary for each CoR and/or LoA because they may support different payloads (e.g., from 300 bytes to 12,000 bytes) under a strict delay requirement. In various embodiments, different CoR and/or LoA combinations may use provisioning of QoS and/or radio parameters (e.g., even for the same V2X application—such as platooning).

In certain embodiments, a V2X communication may be in a multi-operator environment because it may not be possible to ensure that only one operator will offer a V2X service. Such multi-operator environments may include multi-PLMN roaming and/or non-roaming configurations.

In some embodiments, such as in non-roaming configurations, communication may be among V2X UEs registered to different PLMNs for exchanging advanced driving and/or safety-related messages. As used herein, a V2X UE may include one or more of the following: 1) one or more applications related to one or more V2X services; 2) one or more applications acting as middleware clients; and/or 3) a communication entity. In such embodiments, radio resources for communication may be either operator-managed (e.g., FR1 and FR2 spectrum bands may be used for 5G V2X services) or not managed by an operator (e.g. ITS bands—licensed frequency band of 5.9 GHz (5.85 GHz-5.925 GHz)). Moreover, in such embodiments, if more than one network provides assistance in a control plane (e.g., semi-persistent and/or dynamic scheduling of SL resources by a BS, provisioning of SL radio parameters by a PCF and/or a V2XCF), coordination between involved PLMNs may be done. Further, in such embodiments, network-assisted V2X may be supported in both EPS and 5GS (e.g., denoted as Mode-3 for LTE-V, and Mode-1 for 5GS).

In certain embodiments, three multi-PLMN scenarios may be used for the following V2X services: 1) RAN sharing; 2) multi-PLMN V2X service offering; and/or 3) regional roaming. In such embodiments, multiple operators may selectively coordinate offering of V2X services. The coordination of multiple operators may relate to spectrum resources used for delivering V2V services and respective configurations. In various embodiments, a UE may acquire V2V configurations: 1) by reading SIBs of non-serving PLMNs; 2) via pre-configuration; 3) by serving eNB signaling (e.g., SIBs from a serving PLMN); and/or 4) from a V2X server.

In some embodiments, coordination options may be inadequate for one or more of the following reasons: 1) a network operator does not share information for provisioning parameters provided for V2X users to other network operators, especially if operator managed resources are used (e.g., assumed in 5G-V2X scenarios); 2) setting of PC5 parameters may require involvement of one or more V2X application servers that provide V2X service requirements to a network (e.g., for a single-operator case, a network may translate service requirements to a network provisioning parameters; however, configuration of PC5 parameters for a multi-operator V2X service may use coordination between an application server and all involved PLMNs); 3) a V2X server may not be aware of PC5 provisioning parameters that include resource and QoS parameters (e.g., this may use an enablement layer to provide translation of the PC5 provisioning parameters to service provisioning parameters and vice versa, or the exposure of PC5 parameters from the network to the V2X server); 4) different provisioning may be used for a given LoA for one V2X service and a LoA may be changed while the service is running (e.g., a coordination among operators may be dynamic and/or may include different combinations of parameters based on adapted application requirements); and/or a V2X service may run for UEs that are connected to different PLMNs with different RAT capabilities (e.g., 5G, LTE). In such scenarios, coordination between PLMNs may use more complex interactions that may be undertaken by an application layer (e.g., in LTE-V, a V2XCF may provide provisioning for a PC5, and, in 5GS, a PCF may provide provisioning for the PC5).

In various embodiments, an application layer may support eV2X services. In certain embodiments, a V2X application enabler layer may be used to facilitate efficient use and/or deployment of V2X services over 3GPP systems. In such embodiments, the V2X application enabler layer may include a VAE server that may be PLMN-owned, a 3rd party server, a vertical server, and/or one or more VAE clients at a vehicle side. In some embodiments, a VAE server may be a middleware platform that provides support functionalities to enable clients and/or may interact with application specific servers (e.g., a platooning server) an involved PLMNs to facilitate meeting per vertical requirements. In certain embodiments, a VAE server may use SEAL services that may include common support functionalities for all verticals. In such embodiments, the VAE server may be co-located with SEAL servers.

Table 1 shows one embodiment of multi-PLMN coordination.

TABLE 1

| Multi-PLMN Support by Application Enabler Layer |
|---|
| The V2X communication may be multi operator environment since it is not possible to ensure that only one operator will offer the V2X service. Basic safety critical services or advanced driving assistance applications as platooning are some examples of V2X services that may be in multiple PLMN environments. |
| The involvement of an AF in multi-PLMN interactions may be possible via N33 and T8. In this regard, AF may support efficient interworking of multiple PLMNs in non-roaming scenarios by communicating with multiple NEFs and NEF + SCEF via N33 and T8. |
| The VAE server, acting as AF, may be capable of receiving network & QoS parameters from one or multiple PLMNs, as well as receiving application requirements from one or multiple application servers. |
| Hence, VAE server could support some multi-PLMN interactions in the above scenarios (e.g. by configuring QoS/network parameters on behalf of underlying PLMNs). |
| The application layer functional model and VAE layer capabilities may be enhanced to support multi-PLMN interactions. |

In various embodiments: 1) an initial configuration of PC5 parameters in multi-PLMN scenarios may be used; and/or 2) an adaptation of a configuration of PC5 parameters may be based on application-triggered or network-triggered changes.

In certain embodiments, PC5 provisioning and coordinated configuration in multi-operator network-assisted V2X scenarios may be controlled by a middleware application entity. In some embodiments, a middleware application entity may include the following: 1) receiving input (e.g., application requirements) from one or more V2X application servers (e.g., the application requirements may include one or more of the following: a) a multi-PLMN service indication, b) a level of coordination and/or granularity, c) PLMN priorities, d) a KPI and/or a QoS per session, e) an application to service mapping, f) user identifiers, g) PLMN ids, h) a service area and/or a geographical area, i) assistance information (e.g., traffic conditions, weather, maps, etc.), and/or j) a service to LoA mapping); 2) receiving input from one or more applications and/or clients of one or more V2X UEs that include at least one of the following: a PC5 status, PC5 measurements, PC5 analytics, a PC5 discovery indication, an out of coverage indication, an out of coverage expectation, CBR measurements, and/or UE context information; 3) a new functionality at the middleware entity for determining coordinated provisioning parameters for PC5 communication for one or more V2V multi-operator sessions for a V2X service area (e.g., the provisioning parameters may be an initial coordinated provisioning configuration and/or an adaptation of the coordinated provisioning due to application updated requirements or PC5 condition changes); 4) sending to one or more applications and/or clients of the one or more V2X UEs the coordinated provisioning parameters for PC5 (e.g., radio parameters, PC5 policy parameters, and so forth); and/or 5) sending to one or more networks the provisioning parameters for the respective UEs via N33 and/or T8 (e.g., from an AF). As used herein, N33 may be a reference point between an NEF and an AF. Moreover, T8 may be a reference point between an SCEF and an application server or an AF.

Figure 4:
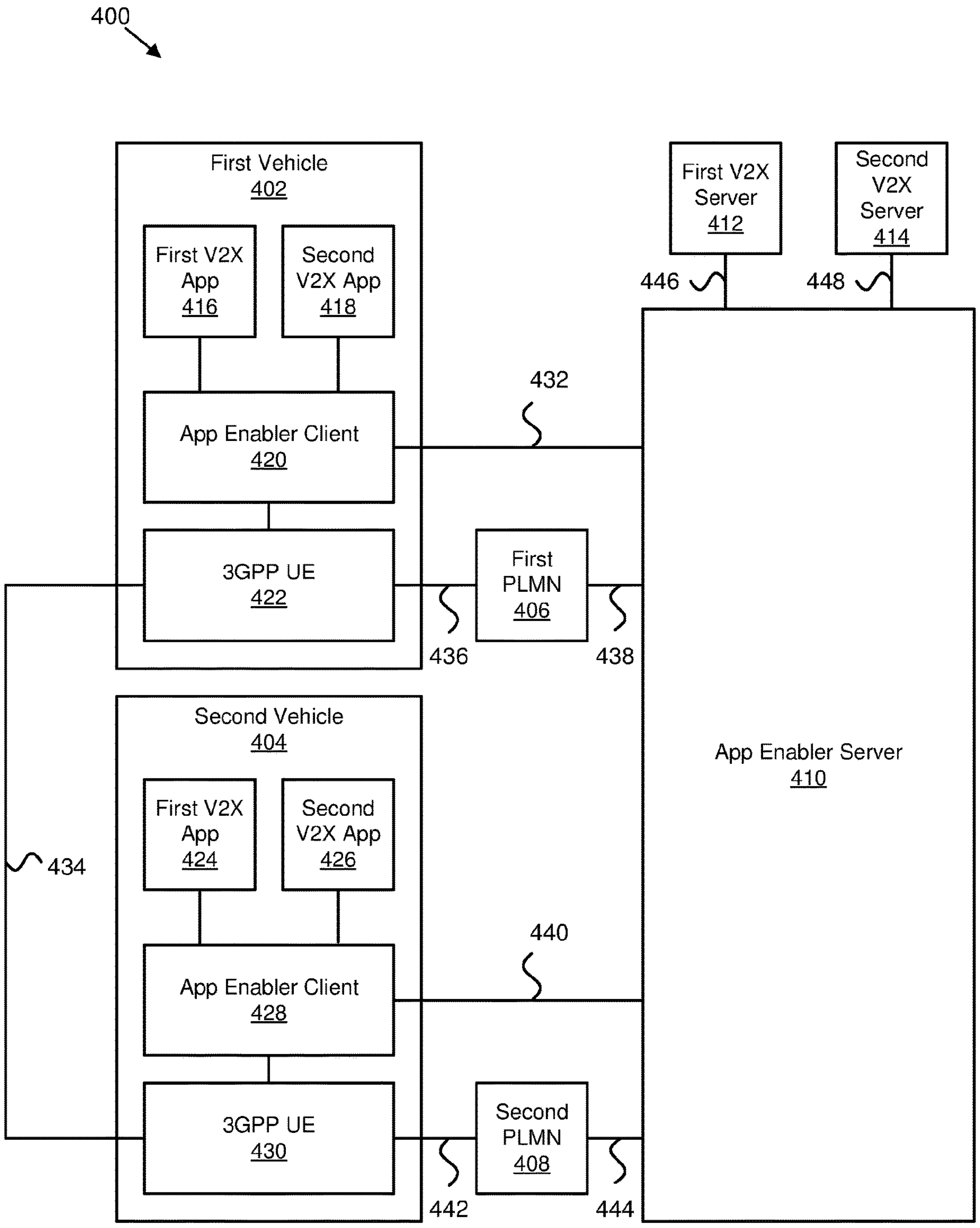
FIG. 4 is a schematic block diagram illustrating one embodiment of a system for obtaining and/or receiving application requirements for vehicle-to-everything applications.

FIG. 4 is a schematic block diagram illustrating one embodiment of a system 400 for obtaining and/or receiving application requirements for vehicle-to-everything applications. The system 400 includes a first vehicle 402 (e.g., V2X vehicle), a second vehicle 404 (e.g., V2X vehicle), a first PLMN 406, a second PLMN 408, an application ("App") enabler server 410 (e.g., middleware application entity), a first V2X server 412, and a second V2X server 414. Furthermore, the first vehicle 402 includes a first V2X application 416, a second V2X application 418, an application enabler client 420, and a 3GPP UE 422. Moreover, the second vehicle 404 includes a first V2X application 424, a second V2X application 426, an application enabler client 428, and a 3GPP UE 430. The application enabler client 420 of the first vehicle 402 communicates via a communication link 432 with the application enabler server 410. The 3GPP UE 422 of the first vehicle 402 may communicate via a communication link 434 with the 3GPP UE 430 of the second vehicle 404. Further, the 3GPP UE 422 of the first vehicle 402 communicates via a communication link 436 with the first PLMN 406. Moreover, the first PLMN 406 communicates via a communication link 438 (e.g., N33, T8) with the application enabler server 410. The application enabler client 428 of the second vehicle 404 communicates via a communication link 440 with the application enabler server 410. Further, the 3GPP UE 430 of the second vehicle 404 communicates via a communication link 442 with the second PLMN 408. Moreover, the second PLMN 408 communicates via a communication link 444 (e.g., N33, T8) with the application enabler server 410. In addition, the first V2X server 412 communicates via a communication link 446 with the application enabler server 410. The second V2X server 414 communicates via a communication link 448 with the application enabler server 410.

In some embodiments, an initial provisioning may be performed as soon as UEs are authorized to use PC5 per PLMN. In such embodiments, an additional provisioning may be used at a middleware for ensuring that provisioning of radio parameters is coordinated among operators involved at a PC5 session.

In various embodiments, an initial provisioning of parameters (e.g., coordinated provisioning of parameters) may be provided by an application enabler server to V2X UEs. The initial provisioning may include at least one of the following: 1) radio parameters (e.g., includes the radio parameters per PC5 RAT (e.g., LTE PC5, NR PC5) with geographical areas and an indication of whether they are operator managed or non-operator managed); 2) a policy and/or parameters per RAT for PC5 TX profile selection; 3) a policy and/or parameters that include setting of PPPP and/or PPPR if LTE PC5 is selected; 4) a policy and/or parameters if NR PC5 is selected (e.g., NR PC5 QoS mapping configuration may be per flow due to NR PC5 using a bearer concept and LTE PC5 may have per packet QoS handling); 5) AS layer configurations; 6) a time validity; 7) a multi-PLMN V2X service flag and/or notification; 8) a configuration of TX and/or RX resource pools per V2X service type or geographical area; 9) radio parameters for joint utilization per multi-PLMN V2X service; 10) a list of available PC5 5QIs (or PQIs) per PLMN; 11) a joint PC5 QoS mapping configuration; 11) an allowed PLMN list and capabilities for joint radio resource utilization; 12) a PLMN priority over joint resources; 13) a service-to-LoA indication; and/or 14) a geographical area for the initial provisioning.

In certain embodiments, an initial provisioning requires application-related information from one or more V2X servers that indicate information such as: provisioning parameters per PLMN, information from V2X UEs regarding a PC5 status, information from V2X UEs regarding measurements, information from V2X UEs regarding analytics, a PC5 discovery indication, an out of coverage expectation, an out of coverage indication, CBR measurements, and/or UE context information.

In some embodiments, an initial trigger for additional provisioning may come from a V2X server and/or a V2X application enabler client at a UE that wants to establish a PC5 connection with users that belong to different PLMNs.

In various embodiments, a mechanism for applying provisioning parameters after coordination may either be sent to involved networks to update PCC rules (e.g., to a PCF for 5GS or to a PCRF for EPS) by an AF (e.g., AF request to PCF) or by a UE to update the policy (e.g., UE policy update request to an AMF and/or a PCF).

In certain embodiments, an adaptation of an initial provisioning of parameters (e.g., updated provisioning configuration) may be performed after a V2X UE or an application server captures a change that may result in a change of the initial provisioning of parameters (e.g., PC5 provisioning parameters). In such embodiments, the updated provisioning configuration may be used by middleware to facilitate setting of radio parameters coordinated among operators involved in a PC5 session.

In some embodiments, an updated provisioning configuration (e.g., reconfiguration of the initial provisioning of parameters) may be provided by a middleware server to V2X UEs and may include one or more of the following: 1) radio parameters (e.g., includes the radio parameters per PC5 RAT (e.g., LTE PC5, NR PC5) with geographical areas and an indication of whether they are operator managed or non-operator managed); 2) a policy and/or parameters per RAT for PC5 TX profile selection; 3) a policy and/or parameters that include setting of PPPP and/or PPPR if LTE PC5 is selected; 4) a policy and/or parameters if NR PC5 is selected (e.g., NR PC5 QoS mapping configuration may be per flow due to NR PC5 using a bearer concept and LTE PC5 may have per packet QoS handling); 5) AS layer configurations; 6) a time validity; 7) a geographical area for the provisioning; 8) a multi-PLMN V2X service flag and/or notification; 9) a configuration of TX and/or RX resource pools per V2X service type or geographical area; 10) radio parameters for joint utilization per multi-PLMN V2X service; 11) a list of available PQIs per PLMN; 12) a joint PC5 QoS mapping configuration; 13) an allowed PLMN list and capabilities for joint radio resource utilization; 14) a PLMN priority over the joint resources; 15) a service-to-LoA indication and/or mapping; 16) delta parameters from the initial provisioning; and/or 17) a cause for the provisioning adaptation (e.g., 1. PC5 QoS, resource, and/or availability change, 2. LoA change, 3. group formation adaptation, 4. traffic congestion in a service area, and so forth).

In various embodiments, a reconfiguration requires application-related information from one or more V2X servers that indicate information such as: provisioning parameters per PLMN, information from V2X UEs regarding a PC5 status, information from V2X UEs regarding measurements, information from V2X UEs regarding analytics, a PC5 discovery indication, an out of coverage expectation, an out of coverage indication, CBR measurements, and/or UE context information.

In certain embodiments, a PC5 radio configuration change may occur due to change of load, channel conditions, expected congestions, one or more application adaptation (e.g., change of LoA, group formation, service coverage, service range). In some embodiments, an application server or an application of one or more UEs may trigger an adaptation (e.g., reconfiguration) based on a type of change (e.g., a PC5 status change may be triggered by a UE).

In a first embodiment, there may be triggering by a V2X server and/or provisioning via an AF request to a PCF for involved PLMNs.

In the first embodiment, an enabler server (e.g., a VAE server and/or SEAL server) provides a configuration (e.g., or reconfiguration) by coordinating policies and/or radio parameters for multiple PLMNs. In the first embodiment, a trigger for functionality activation may be a requirement from a V2X server (e.g., a V2X server that has all available provisioning information per PLMN). In some embodiments, a VAE client and/or SEAL client may provide to a VAE server information about a PC5 status and/or conditions to facilitate giving an awareness at an enabler server to capture a PC5 resource situation (e.g., load of radio resources, congestion, LOS and/or NLOS conditions, interference, PC5 QoS monitoring) to enable deciding a multi-PLMN configuration and/or reconfiguration (e.g., this may be resource restrictions and/or join resource allocation). In such embodiments, coordinated provisioning may be applied via an AF request for service parameter provisioning from a PCF and/or PCRF.

Figure 5:
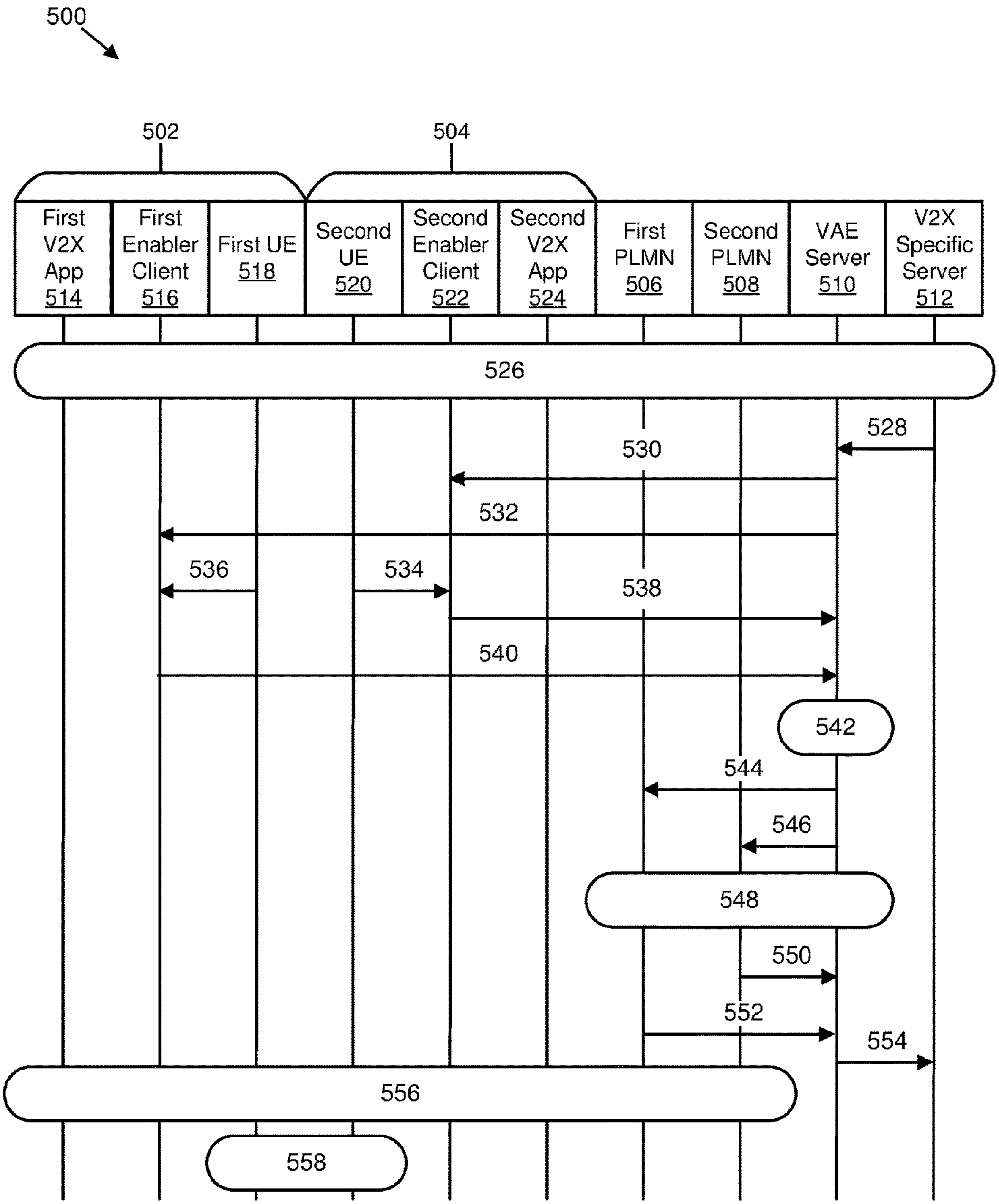
FIG. 5 is a diagram illustrating one embodiment of communications for updating application requirements.

FIG. 5 is a diagram illustrating one embodiment of communications 500 for updating application requirements. The communications 500 are between a first V2X vehicle 502, a second V2X vehicle 504, a first PLMN 506, a second PLMN 508, a VAE server 510 (e.g., or middleware entity, an application enabler server, a SEAL server), and a V2X specific server 512. The first V2X vehicle 502 includes a first V2X application 514, a first enabler client 516, and a first UE 518. Moreover, the second V2X vehicle 504 includes a second UE 520, a second enabler client 522, and a second V2X application 524. As may be appreciated, any of the communications 500 described herein may include one or more messages.

In some embodiments, the first UE 518 and the second UE 520 may be authorized 526 for PC5 communications with the first PLMN 506 and the second PLMN 508 via communications between various devices, respectively.

In a first communication 528 transmitted from the V2X specific server 512 to the VAE server 510, the V2X specific server 512 sends an application requirement message to the VAE server 510. The application requirement message may provide to the VAE server 510 a requirement for performing coordinated provisioning for V2X services that span more than one PLMN, and may also provide information related to a per PLMN configuration and/or policies. The application requirement message may include one or more of the following parameters: one or more V2X UE identifications (e.g., GPSI, external ID); a V2X service ID; PLMN IDs; a transaction ID; a group ID for a group of UEs (e.g., for groupcast and/or broadcast scenario); radio parameters; a policy and/or parameters per RAT for PC5 TX profile selection; a policy and/or parameters if LTE PC5 is selected; a policy and/or parameters if NR PC5 is selected; AS layer configurations; a multi-PLMN V2X service flag and/or notification; a level of coordination and PLMN info; a V2X service to LoA indication; a time validity and/or geographical area for a provisioning requirement; and/or a cause for a provisioning adaptation (e.g., 1. PC5 QoS, resource, and/or availability change, 2. LoA change, 3. group formation adaptation, 4. traffic congestion in a service area, and so forth).

In a second communication 530 transmitted from the VAE server 510 to the second enabler client 522 and in a third communication 532 transmitted from the VAE server 510 to the first enabler client 516, the VAE server 510 sends a PC5 monitoring request message to the second and first enabler clients 522 and 516 (e.g., VAE clients and/or SEAL clients of affected V2X UEs) corresponding to the UE IDs provided in the first communication 528. The PC5 monitoring request message may include the UE IDs, service ID, radio parameters to monitor (e.g., request for CBR measurements, averaged channel conditions, load indication, and so forth), a policy and/or parameters monitoring request (e.g., per RAT), and/or UE context information.

In a fourth communication 534 transmitted from the second UE 520 to the second enabler client 522 and in a fifth communication 536 transmitted from the first UE 518 to the first enabler client 516, the first and second UEs 518 and 520 transmit to the second and first enabler clients 522 and 516 (e.g., VAE clients and/or SEAL client of the affected V2X UEs) from the AS layer of the first and second UEs 518 and 520 L1/L2 measurements as well as policies and/or parameters per RAT and UE context information as requested in the second and third communications 530 and 532.

In a sixth communication 538 transmitted from the second enabler client 522 to the VAE server 510 and in a seventh communication 540 transmitted from the first enabler client 516 to the VAE server 510, the second and first enabler clients 522 and 516 (e.g., VAE client and/or SEAL clients of affected V2X UEs) send a PC5 monitoring response and/or report message to the VAE server 510 which indicates at least one of the following: radio measurements which may be CSI, RRM, RLM, and/or CBR measurements or an abstracted and/or averaged version of the radio measurements; up-to-date information on a policy and/or parameters (e.g., PQI attributes, a communication range, a RAT availability, a RAT preference, and so forth); and/or PC5 related events (e.g., a PC5 unavailability, LOS and/or NLOS conditions, a request for more bandwidth, an inter-session interference indication, a PC5 QoS expected downgrade, moving out of PLMN coverage, and so forth).

In certain embodiments, the VAE Server 510 derives 542 a coordinated PC5 provisioning configuration that takes into account the information from multiple PLMNs. Certain criterion for selecting updated polices and radio parameters may be to ensure meeting KPIs for all involved PC5 sessions in a given service and/or geographical area (e.g., set in the first communication 528) while efficiently utilizing the radio resources in multi-PLMN environments. In some embodiments, such as for operator managed resources, some restrictions of usage of resources may play a role on the decisions.

In an eighth communication 544 transmitted from the VAE server 510 to the first PLMN 506 and in a ninth communication 546 transmitted from the VAE server 510 to the second PLMN 508, the VAE server 510 acts as an AF and creates 548 an AF request to perform a service parameter provisioning procedure with the PCFs and/or PCRFs in both the first and second PLMNs 506 and 508. The eighth and ninth communications 544 and 546 may include a request message (e.g., Nnef_service_parameter_create_Req). Service provisioning parameters for the service provisioning procedure include certain predetermined parameters (e.g., radio and/or policy parameters that may be provided by the V2X specific server 512) and one or more of the following: UE IDs, an application ID, a V2X server ID, an AF ID, a multi-PLMN V2X service flag and/or notification, radio parameters for joint utilization per multi-PLMN V2X service, a list of available PQIs per PLMN, a joint PC5 QoS mapping configuration, an allowed PLMN list and capabilities for joint radio resource utilization, a PLMN priority over joint resources, a service-to-LoA indication, a geographical area for the provisioning, delta parameters from the initial provisioning, and/or a cause for provisioning adaptation (e.g., 1. PC5 QoS, resource, and/or availability change, 2. an LoA change, 3. A group formation adaptation, 4. A traffic congestion in a service area, and so forth).

In a tenth communication 550 transmitted from the second PLMN 508 to the VAE server 510 and in an eleventh communication 552 transmitted from the first PLMN 506 to the VAE server 510, the second and first PLMNs 508 and 506 transmit a response message (e.g., Nnef_service_parameter_create_Response) to the VAE server 510.

In a twelfth communication 554 transmitted from the VAE server 510 to the V2X specific server 512, the VAE server 510 sends a notification to the V2X specific server 512 to inform the V2X specific server 512 of the fulfilment of the provisioning configuration.

In certain embodiments, the UE policy updates are made 556 with the new provisioning policies. In various embodiments, PC5 establishment is performed 558.

In a second embodiment, there may be triggering by a V2X server and/or provisioning via UE policy provisioning.

In the second embodiment, an enabler server (e.g., a VAE server and/or SEAL server) provides a configuration (e.g., or reconfiguration) by coordinating policies and/or radio parameters for multiple PLMNs. In the second embodiment, a trigger for functionality activation may be a requirement from a V2X server (e.g., a V2X server that has all the available provisioning information per PLMN). In some embodiments, a VAE client and/or SEAL client may provide to a VAE server information about a PC5 status and/or conditions to facilitate giving an awareness at the enabler server to capture a PC5 resource situation to enable deciding on a multi-PLMN configuration and/or reconfiguration. In such embodiments, coordinated provisioning may be applied via UE policy provisioning signaling from one or more of UEs to an AMF and/or PCF.

Figure 6:
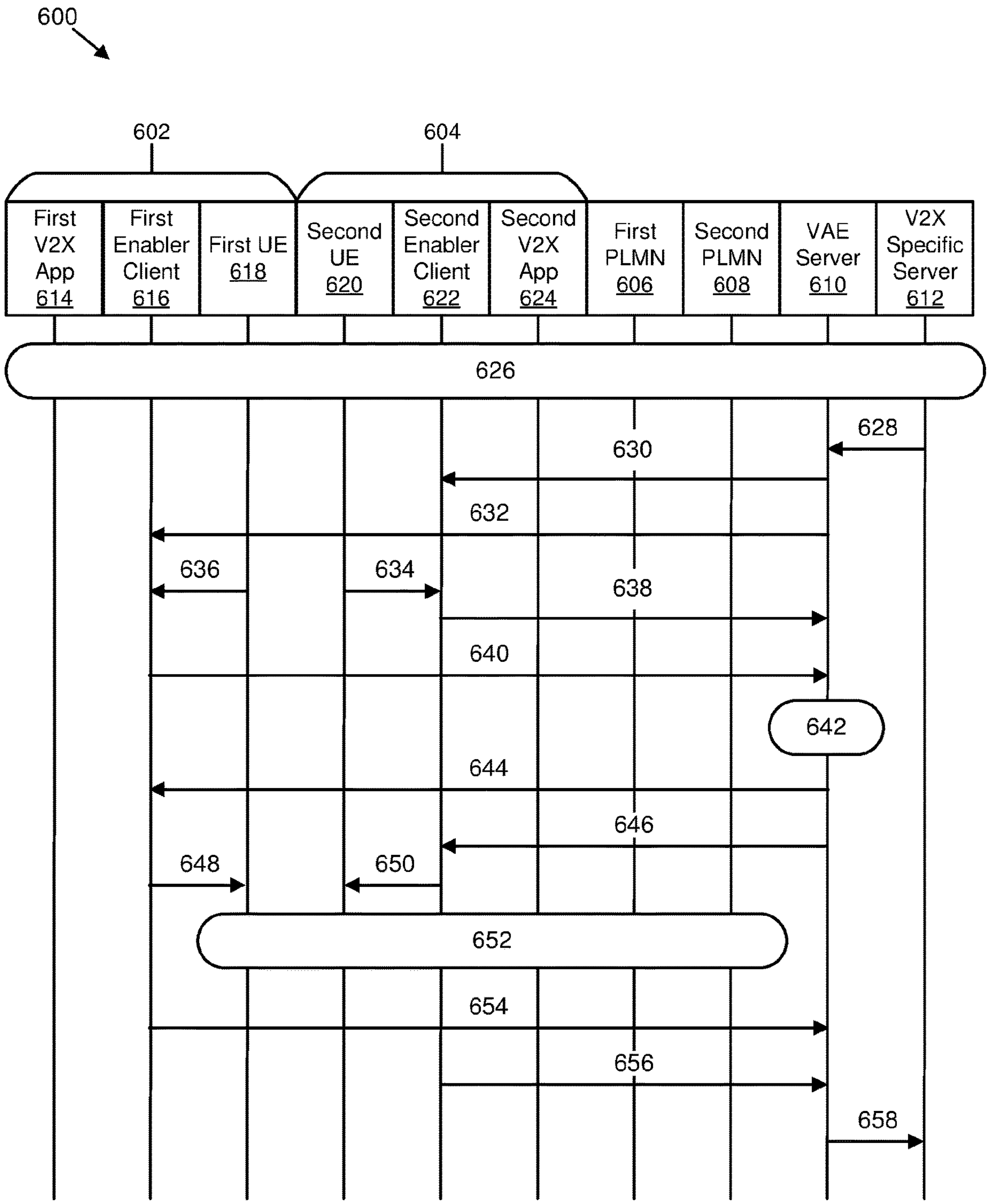
FIG. 6 is a diagram illustrating another embodiment of communications for updating application requirements.

FIG. 6 is a diagram illustrating another embodiment of communications 600 for updating application requirements. The communications 600 are between a first V2X vehicle 602, a second V2X vehicle 604, a first PLMN 606, a second PLMN 608, a VAE server 610 (e.g., or middleware entity, an application enabler server, a SEAL server), and a V2X specific server 612. The first V2X vehicle 602 includes a first V2X application 614, a first enabler client 616, and a first UE 618. Moreover, the second V2X vehicle 604 includes a second UE 620, a second enabler client 622, and a second V2X application 624. As may be appreciated, any of the communications 600 described herein may include one or more messages.

In some embodiments, the first UE 618 and the second UE 620 may be authorized 626 for PC5 communications with the first PLMN 606 and the second PLMN 608 via communications between various devices, respectively.

In a first communication 628 transmitted from the V2X specific server 612 to the VAE server 610, the V2X specific server 612 sends an application requirement message to the VAE server 610. The application requirement message may provide to the VAE server 610 a requirement for performing coordinated provisioning for V2X services that span more than one PLMN, and may also provide information related to a per PLMN configuration and/or policies. The application requirement message may include one or more of the following parameters: one or more V2X UE identifications (e.g., GPSI, external ID); a V2X service ID; PLMN IDs; a transaction ID; a group ID for a group of UEs (e.g., for groupcast and/or broadcast scenario); radio parameters; a policy and/or parameters per RAT for PC5 TX profile selection; a policy and/or parameters if LTE PC5 is selected; a policy and/or parameters if NR PC5 is selected; AS layer configurations; a multi-PLMN V2X service flag and/or notification; a level of coordination and PLMN info; a V2X service to LoA indication; a time validity and/or geographical area for a provisioning requirement; and/or a cause for a provisioning adaptation (e.g., 1. PC5 QoS, resource, and/or availability change, 2. LoA change, 3. group formation adaptation, 4. traffic congestion in a service area, and so forth).

In a second communication 630 transmitted from the VAE server 610 to the second enabler client 622 and in a third communication 632 transmitted from the VAE server 610 to the first enabler client 616, the VAE server 610 sends a PC5 monitoring request message to the second and first enabler clients 622 and 616 (e.g., VAE clients and/or SEAL clients of affected V2X UEs) corresponding to the UE IDs provided in the first communication 628. The PC5 monitoring request message may include the UE IDs, service ID, radio parameters to monitor (e.g., request for CBR measurements, averaged channel conditions, load indication, and so forth), a policy and/or parameters monitoring request (e.g., per RAT), and/or UE context information.

In a fourth communication 634 transmitted from the second UE 620 to the second enabler client 622 and in a fifth communication 636 transmitted from the first UE 618 to the first enabler client 616, the first and second UEs 618 and 620 transmit to the second and first enabler clients 622 and 616 (e.g., VAE clients and/or SEAL client of the affected V2X UEs) from the AS layer of the first and second UEs 618 and 620 L1/L2 measurements as well as policies and/or parameters per RAT and UE context information as requested in the second and third communications 630 and 632.

In a sixth communication 638 transmitted from the second enabler client 622 to the VAE server 610 and in a seventh communication 640 transmitted from the first enabler client 616 to the VAE server 610, the second and first enabler clients 622 and 616 (e.g., VAE clients and/or SEAL clients of affected V2X UEs) send a PC5 monitoring response and/or report message to the VAE server 610 which indicates at least one of the following: radio measurements which may be CSI, RRM, RLM, and/or CBR measurements or an abstracted and/or averaged version of the radio measurements; up-to-date information on a policy and/or parameters (e.g., PQI attributes, a communication range, a RAT availability, a RAT preference, and so forth); and/or PC5 related events (e.g., a PC5 unavailability, LOS and/or NLOS conditions, a request for more bandwidth, an inter-session interference indication, a PC5 QoS expected downgrade, moving out of PLMN coverage, and so forth).

In certain embodiments, the VAE Server 610 derives 642 a coordinated PC5 provisioning configuration that takes into account the information from multiple PLMNs. Certain criterion for selecting updated polices and radio parameters may be to ensure meeting KPIs for all involved PC5 sessions in a given service and/or geographical area (e.g., set in the first communication 628) while efficiently utilizing the radio resources in multi-PLMN environments. In some embodiments, such as for operator managed resources, some restrictions of usage of resources may play a role on the decisions.

In an eighth communication 644 transmitted from the VAE server 610 to the first enabler client 616 and in a ninth communication 646 transmitted from the VAE server 610 to the second enabler client 622, the VAE server 610 sends a coordinated PC5 provisioning request message to the first and second enabler clients 616 and 622 to provide updated parameters. Service provisioning parameters for the PC5 provisioning request message include certain predetermined parameters (e.g., radio and/or policy parameters that may be provided by the V2X specific server 612) and one or more of the following: UE IDs, an application ID, a V2X server ID, an AF ID, a multi-PLMN V2X service flag and/or notification, radio parameters for joint utilization per multi-PLMN V2X service, a list of available PQIs per PLMN, a joint PC5 QoS mapping configuration, an allowed PLMN list and capabilities for joint radio resource utilization, a PLMN priority over joint resources, a service-to-LoA indication, a geographical area for the provisioning, delta parameters from the initial provisioning, and/or a cause for provisioning adaptation (e.g., 1. PC5 QoS, resource, and/or availability change, 2. an LoA change, 3. A group formation adaptation, 4. A traffic congestion in a service area, and so forth).

In a tenth communication 648 transmitted from the first enabler client 616 to the first UE 618 and in an eleventh communication 650 transmitted from the second enabler client 622 to the second UE 620, the first and second enabler clients 616 and 618 (e.g., VAE clients and/or SEAL clients) provide the PC5 provisioning request message to an AS layer of the affected V2X-UEs (e.g., the first UE 618 and the second UE 620) to trigger 652 a UE policy configuration (e.g., the first UE 618 to the first PLMN 606 (e.g., PCF) and the second UE 620 to the second PLMN 608 (e.g., PCF)).

In a twelfth communication 654 transmitted from the first enabler client 616 to the VAE server 610 and in a thirteenth communication 656 transmitted from the second enabler client 622 to the VAE server 610, the first and second enabler clients 616 and 622 (e.g., one or more VAE clients and/or SEAL clients) send a coordinated PC5 provisioning response message to the VAE server 610 (e.g., a respective VAE server and/or SEAL server) to notify the VAE server 610 of the result (e.g., ACK/NACK, positive or negative acknowledgement) based on the tenth and eleventh communications 648 and 650.

In a fourteenth communication 658 transmitted from the VAE server 610 to the V2X specific server 612, the VAE server 610 sends a notification to the V2X specific server 612 to inform the V2X specific server 612 of the fulfilment of the provisioning configuration.

In a third embodiment, there may be triggering by a V2X UE, a configuration by an enabler server, and/or provisioning via either an AF, a PCF, and/or a UE Policy In the third embodiment, the trigger for functionality activation may be a requirement from an application of the V2X-UE. In various embodiments, an enabler server (e.g., VAE server and/or SEAL server) may provide a configuration (e.g., or reconfiguration) by coordinating policies and/or radio parameters for multiple PLMNs based on a trigger by a UE. In such embodiments, coordinated policy provisioning execution may happen either via an AF request to a PCF and/or a PCRF or via UE policy provisioning.

Figure 7:
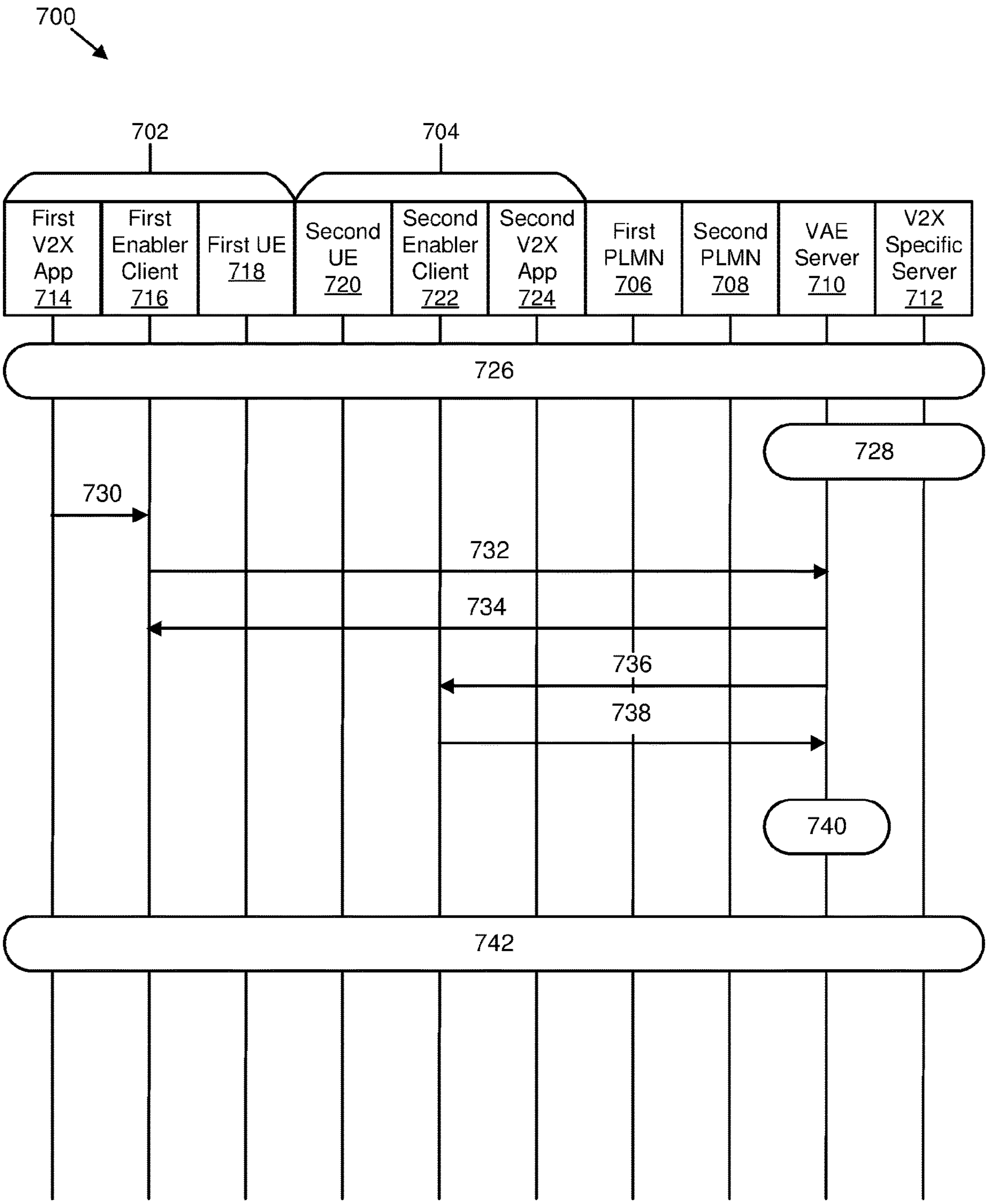
FIG. 7 is a diagram illustrating a further embodiment of communications for updating application requirements.

FIG. 7 is a diagram illustrating a further embodiment of communications 700 for updating application requirements. The communications 700 are between a first V2X vehicle 702, a second V2X vehicle 704, a first PLMN 706, a second PLMN 708, a VAE server 710 (e.g., or middleware entity, an application enabler server, a SEAL server), and a V2X specific server 712. The first V2X vehicle 702 includes a first V2X application 714, a first enabler client 716, and a first UE 718. Moreover, the second V2X vehicle 704 includes a second UE 720, a second enabler client 722, and a second V2X application 724. As may be appreciated, any of the communications 700 described herein may include one or more messages.

In some embodiments, the first UE 718 and the second UE 720 may be authorized 726 for PC5 communications with the first PLMN 706 and the second PLMN 708 via communications between various devices, respectively.

In various embodiments, the VAE server 710 may have received 728 V2X provisioning and/or parameters per PLMN from the V2X specific server 712.

In a first communication 730 transmitted from the first V2X application 714 to the first enabler client 716, the first V2X application 714 sends an application requirement message to the first enabler client 716. The application requirement message may provide to the first enabler client 716 a requirement for performing coordinated provisioning for V2X services that span more than one PLMN, and may also provide information related to a per PLMN configuration and/or policies. The application requirement message may include one or more of the following parameters: one or more V2X UE identifications (e.g., GPSI, external ID); a V2X service ID; PLMN IDs; a transaction ID; a group ID for a group of UEs (e.g., for groupcast and/or broadcast scenario); radio parameters; a policy and/or parameters per RAT for PC5 TX profile selection; a policy and/or parameters if LTE PC5 is selected; a policy and/or parameters if NR PC5 is selected; AS layer configurations; a multi-PLMN V2X service flag and/or notification; a level of coordination and PLMN info; a V2X service to LoA indication; a time validity and/or geographical area for a provisioning requirement; and/or a cause for a provisioning adaptation (e.g., 1. PC5 QoS, resource, and/or availability change, 2. LoA change, 3. group formation adaptation, 4. traffic congestion in a service area, and so forth).

In a second communication 732 transmitted from the first enabler client 716 to the VAE server 710, the first enabler client 716 sends a coordinated PC5 provisioning request message to the VAE server 710 to request that the VAE server 710 coordinate provisioning parameters taking into account the VAE server 710 awareness on all involved per PLMN provisioning. Service provisioning parameters for the PC5 provisioning request message may include one or more of the following: UE IDs, a group ID, an application ID, a V2X server ID, an AF ID, a service ID, a PC5 session ID, a transaction ID, a multi-PLMN V2X service flag and/or notification, a level of coordination requirement (e.g., radio parameters, a policy per RAT, parameters per RAT), location information, radio parameters for joint utilization per multi-PLMN V2X service, a list of available PQIs per PLMN, a joint PC5 QoS mapping configuration, an allowed PLMN list and capabilities for joint radio resource utilization, a PLMN priority over joint resources, a service-to-LoA indication, group information (e.g., members, formation), a geographical area for the provisioning, delta parameters from the initial provisioning, and/or a cause for provisioning adaptation (e.g., 1. PC5 QoS, resource, and/or availability change, 2. an LoA change, 3. a group formation adaptation, 4. a traffic congestion in a service area, and so forth).

In a third communication 734 transmitted from the VAE server 710 to the first enabler client 716, the VAE server 710 sends a PC5 provisioning coordination response message to the first enabler client 716 to notify the first enabler client 716 of the result (e.g., ACK/NACK, positive or negative acknowledgement).

In a fourth communication 736 transmitted from the VAE server 710 to the second enabler client 722, the VAE server 710 optionally sends a PC5 monitoring request message to the second enabler client 722. The PC5 monitoring request message may include the UE IDs, service ID, radio parameters to monitor (e.g., request for CBR measurements, averaged channel conditions, load indication, and so forth), a policy and/or parameters monitoring request (e.g., per RAT), and/or UE context information.

In a fifth communication 738 transmitted from the second enabler client 722 to the VAE server 710, the second enabler client 722 (e.g., VAE client and/or SEAL client of affected V2X UEs) receives from an AS layer of the second UE 720 measurements as well as policies and/or parameters per RAT and UE context information, and the second enabler client 722 sends a PC5 monitoring response and/or report message to the VAE server 710 which indicates at least one of the following: radio measurements which may be CSI, RRM, RLM, and/or CBR measurements or an abstracted and/or averaged version of the radio measurements; up-to-date information on a policy and/or parameters (e.g., PQI attributes, a communication range, a RAT availability, a RAT preference, and so forth); and/or PC5 related events (e.g., a PC5 unavailability, LOS and/or NLOS conditions, a request for more bandwidth, an inter-session interference indication, a PC5 QoS expected downgrade, moving out of PLMN coverage, and so forth).

The VAE server 710 derives 740 the coordinated PC5 provisioning configuration that takes into account information from multiple PLMNs. Certain criterion for selecting updated polices and radio parameters may be to ensure meeting KPIs for all involved PC5 sessions in a given service and/or geographical area (e.g., set in the first communication 728) while efficiently utilizing the radio resources in multi-PLMN environments. In some embodiments, such as for operator managed resources, some restrictions of usage of resources may play a role on the decisions.

Depending on the provisioning execution (e.g., AF trigger or UE trigger), the following steps 742: 1) Option 1: for AF-based provisioning communications 544 through 554 of FIG. 5 may be completed; and 2) Option 2: for UE policy provisioning communications 644 through 658 of FIG. 6 may be completed.

In a fourth embodiment, there may be PC5 conditions and/or a status update at a V2X UE, reconfiguration by a middleware server, and/or re-provisioning via a UE policy provisioning.

In this fourth embodiment, a trigger for functionality activation may be a change at a PC5 status and/or conditions monitored by an application enabler client. In various embodiments, an enabler server (e.g., VAE server and/or SEAL server) may provide a configuration (e.g., or reconfiguration) by coordinating policies and/or radio parameters for multiple PLMNs based on a trigger by a UE. In such embodiments, coordinated policy provisioning execution may happen either via an AF request to a PCF and/or a PCRF or via UE policy provisioning.

Figure 8:
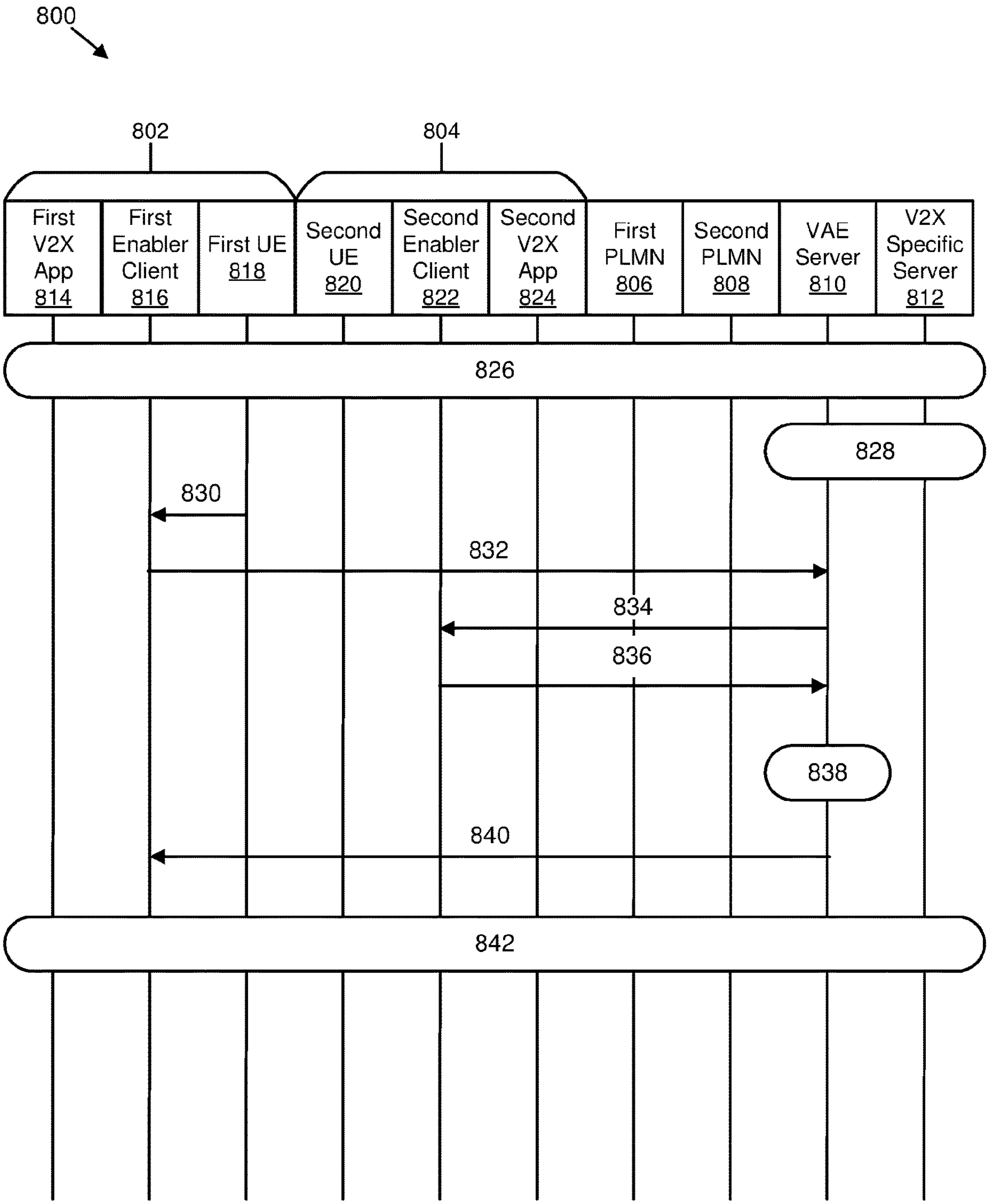
FIG. 8 is a diagram illustrating yet another embodiment of communications for updating application requirements.

FIG. 8 is a diagram illustrating yet another embodiment of communications 800 for updating application requirements. The communications 800 are between a first V2X vehicle 802, a second V2X vehicle 804, a first PLMN 806, a second PLMN 808, a VAE server 810 (e.g., or middleware entity, an application enabler server, a SEAL server), and a V2X specific server 812. The first V2X vehicle 802 includes a first V2X application 814, a first enabler client 816, and a first UE 818. Moreover, the second V2X vehicle 804 includes a second UE 820, a second enabler client 822, and a second V2X application 824. As may be appreciated, any of the communications 800 described herein may include one or more messages.

In some embodiments, the first UE 818 and the second UE 820 may be authorized 826 for PC5 communications with the first PLMN 806 and the second PLMN 808 via communications between various devices, respectively.

In various embodiments, the VAE server 810 may have received 828 V2X provisioning and/or parameters per PLMN from the V2X specific server 812.

In a first communication 830 transmitted from the first UE 818 to the first enabler client 816, the first UE 818 may send a PC5 QoS and/or resource availability change event message to the first enabler client 816. The change event may provide information about possible PC5 QoS degradation, a conflicts indication, and/or an interference indication in one or more radio resource pools and/or a change of LoS conditions.

In a second communication 832 transmitted from the first enabler client 816 to the VAE server 810, the first enabler client 816 sends a PC5 provisioning adaptation request message to the VAE server 810 to request that the VAE server 810 coordinate provisioning parameters taking into account the VAE server 810 awareness on all involved per PLMN provisioning. Service provisioning parameters for the PC5 provisioning adaptation request message may include one or more of the following: UE IDs, a group ID, an application ID, a V2X server ID, an AF ID, a service ID, a PC5 session ID, a transaction ID, a multi-PLMN V2X service flag and/or notification, a level of coordination requirement (e.g., radio parameters, a policy per RAT, parameters per RAT), location information, radio parameters for joint utilization per multi-PLMN V2X service, a list of available PQIs per PLMN, a joint PC5 QoS mapping configuration, an allowed PLMN list and capabilities for joint radio resource utilization, a PLMN priority over joint resources, a service-to-LoA indication, group information (e.g., members, formation), a geographical area for the provisioning, delta parameters from the initial provisioning, and/or a cause for provisioning adaptation (e.g., 1. PC5 QoS, resource, and/or availability change, 2. an LoA change, 3. a group formation adaptation, 4. a traffic congestion in a service area, and so forth).

In a third communication 834 transmitted from the VAE server 810 to the second enabler client 822, the VAE server 810 optionally sends a PC5 monitoring request message to the second enabler client 822. The PC5 monitoring request message may include the UE IDs, service ID, radio parameters to monitor (e.g., request for CBR measurements, averaged channel conditions, load indication, and so forth), a policy and/or parameters monitoring request (e.g., per RAT), and/or UE context information.

In a fourth communication 836 transmitted from the second enabler client 822 to the VAE server 810, the second enabler client 822 (e.g., VAE client and/or SEAL client of affected V2X UEs) receives from an AS layer of the second UE 820 measurements as well as policies and/or parameters per RAT and UE context information, and the second enabler client 822 sends a PC5 monitoring response and/or report message to the VAE server 810 which indicates at least one of the following: radio measurements which may be CSI, RRM, RLM, and/or CBR measurements or an abstracted and/or averaged version of the radio measurements; up-to-date information on a policy and/or parameters (e.g., PQI attributes, a communication range, a RAT availability, a RAT preference, and so forth); and/or PC5 related events (e.g., a PC5 unavailability, LOS and/or NLOS conditions, a request for more bandwidth, an inter-session interference indication, a PC5 QoS expected downgrade, moving out of PLMN coverage, and so forth).

The VAE server 810 derives 838 the coordinated PC5 provisioning configuration that takes into account information from multiple PLMNs. Certain criterion for selecting updated polices and radio parameters may be to ensure meeting KPIs for all involved PC5 sessions in a given service and/or geographical area (e.g., set in the second communication 832) while efficiently utilizing the radio resources in multi-PLMN environments. In some embodiments, such as for operator managed resources, some restrictions of usage of resources may play a role on the decisions.

In a fifth communication 840 transmitted from the VAE server 810 to the first enabler client 816, the VAE server 810 sends a PC5 provisioning adaptation response message to the first enabler client 816 to notify the first enabler client 816 of the result (e.g., ACK/NACK, positive or negative acknowledgement).

Depending on the provisioning execution (e.g., AF trigger or UE trigger), the following steps 842: 1) Option 1: for AF-based provisioning communications 544 through 554 of FIG. 5 may be completed; and 2) Option 2: for UE policy provisioning communications 644 through 658 of FIG. 6 may be completed.

Figure 9:
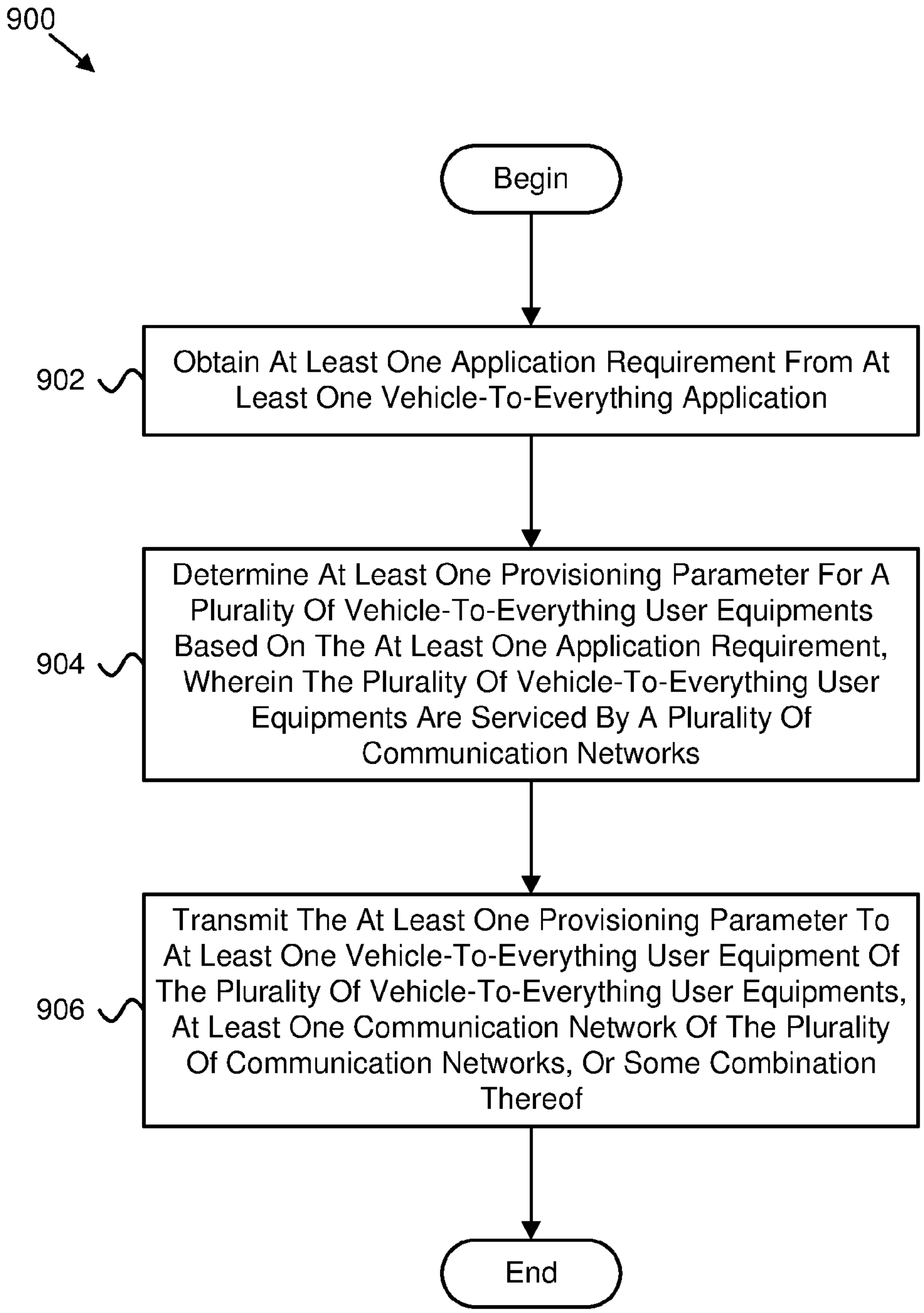
FIG. 9 is a flow chart diagram illustrating one embodiment of a method for obtaining application requirements for vehicle-to-everything applications.

FIG. 9 is a flow chart diagram illustrating one embodiment of a method 900 for obtaining application requirements for vehicle-to-everything applications. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes obtaining 902 at least one application requirement from at least one vehicle-to-everything application. In some embodiments, the method 900 includes determining 904 at least one provisioning parameter for a plurality of vehicle-to-everything user equipments based on the at least one application requirement, wherein the plurality of vehicle-to-everything user equipments are serviced by a plurality of communication networks. In various embodiments, the method 900 includes transmitting 906 the at least one provisioning parameter to at least one vehicle-to-everything user equipment of the plurality of vehicle-to-everything user equipments, at least one communication network of the plurality of communication networks, or some combination thereof.

In certain embodiments, the at least one application requirement comprises a user equipment identifier, a radio parameter, a policy parameter, a public land mobile network identifier, a multiple public land mobile network vehicle-to-everything service indication, a level of coordination, a level of granularity, a public land mobile network priority, a key performance indicator per vehicle-to-everything session, a quality of service per vehicle-to-everything session, an application-to-service mapping, a service area, a geographical area, assistance information, a service-to-level of automation mapping, or some combination thereof. In some embodiments, the at least one vehicle-to-everything application comprises a vehicle-to-everything application server, a vehicle-to-everything application client of a vehicle-to-everything user equipment of the plurality of vehicle-to-everything user equipments, or a combination thereof.

In various embodiments, the at least one provisioning parameter comprises a radio parameter, a policy per radio access technology, a parameter per radio access technology, a policy for a long term evolution network, a policy for a new radio network, an access stratum layer configuration, a time validity, a geographical area, a multiple public land mobile network vehicle-to-everything service flag, a multiple public land mobile network vehicle-to-everything service notification, a resource pool configuration per vehicle-to-everything service type, a resource pool configuration per vehicle-to-everything geographical area, a radio parameter for joint utilization per multiple public land mobile network vehicle-to-everything service, a list of available quality indicators per public land mobile network, a quality of service mapping configuration, an allowed public land mobile network list and capabilities for joint radio resource utilization, a public land mobile network priority over joint resources, a service-to-level of automation mapping, a delta parameter, a cause for provisioning adaptation, or some combination thereof. In one embodiment, the at least one provisioning parameter comprises an initial configuration for the plurality of vehicle-to-everything user equipments.

In certain embodiments, the at least one provisioning parameter comprises an updated configuration for the plurality of vehicle-to-everything user equipments. In some embodiments, the updated configuration is triggered by an adaptation of the at least one application requirement, a sidelink communication requirement, or a combination thereof. In various embodiments, the at least one provisioning parameter is provided to at least one application client of the at least one vehicle-to-everything user equipment.

In one embodiment, the at least one provisioning parameter is provided to the at least one communication network via user plane signaling, control plane signaling, or a combination thereof. As used herein, user plane signaling may be signaling at a protocol stack and/or interface used for user data transmission. The signaling may be application layer signaling, or user plane signaling via one or more networks. Further, as used herein, control plane signaling may be signaling from an application entity to control plane network functions of one or more core networks. In certain embodiments, the method 900 further comprises transmitting a notification to the at least one vehicle-to-everything application as feedback corresponding to the at least one application requirement.

Figure 10:
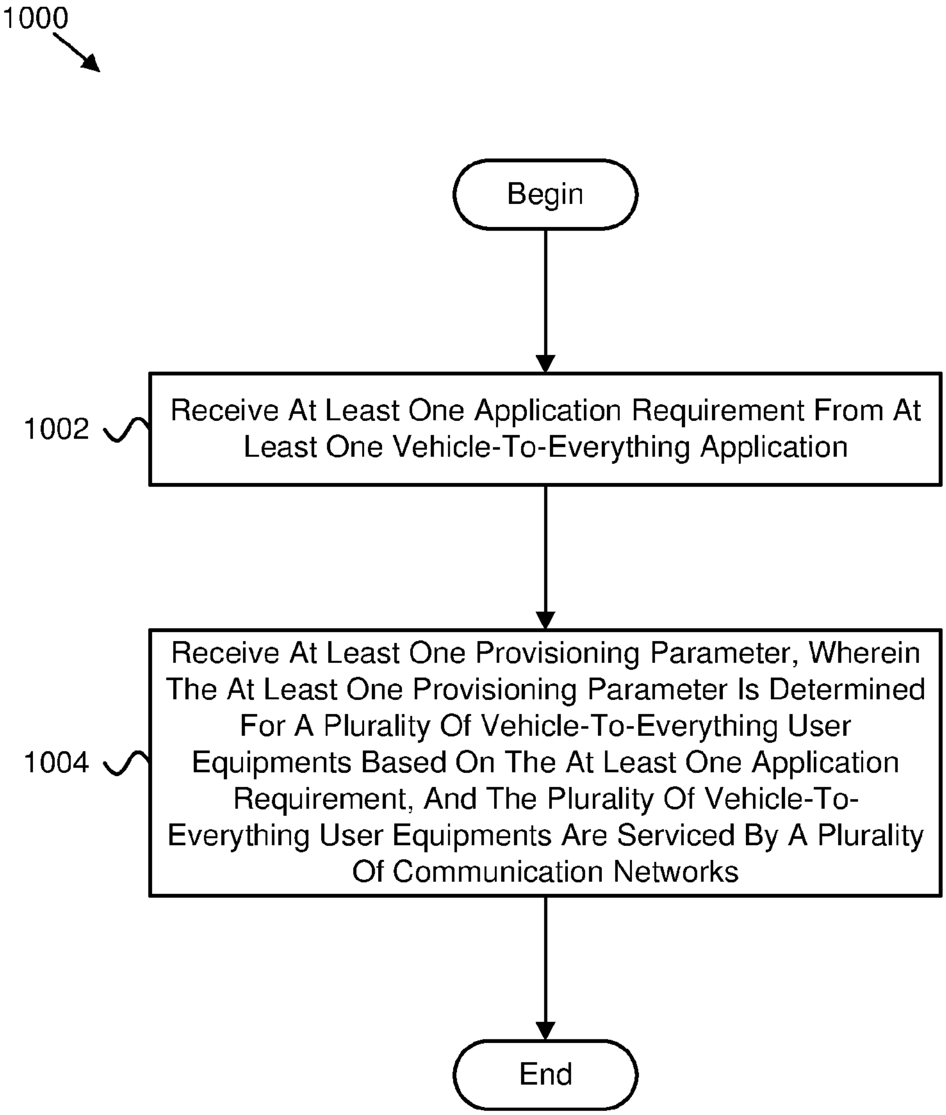
FIG. 10 is a flow chart diagram illustrating one embodiment of a method for receiving application requirements for vehicle-to-everything applications.

FIG. 10 is a flow chart diagram illustrating one embodiment of a method 1000 for receiving application requirements for vehicle-to-everything applications. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002 at least one application requirement from at least one vehicle-to-everything application. In some embodiments, the method 1000 includes receiving 1004 at least one provisioning parameter, wherein the at least one provisioning parameter is determined for a plurality of vehicle-to-everything user equipments based on the at least one application requirement, and the plurality of vehicle-to-everything user equipments are serviced by a plurality of communication networks.

In certain embodiments, the at least one application requirement comprises a user equipment identifier, a radio parameter, a policy parameter, a public land mobile network identifier, a multiple public land mobile network vehicle-to-everything service indication, a level of coordination, a level of granularity, a public land mobile network priority, a key performance indicator per vehicle-to-everything session, a quality of service per vehicle-to-everything session, an application to service mapping, a service area, a geographical area, assistance information, a service to level of automation mapping, or some combination thereof. In some embodiments, the at least one vehicle-to-everything application comprises a vehicle-to-everything application server, a vehicle-to-everything application client of a vehicle-to-everything user equipment of the plurality of vehicle-to-everything user equipments, or a combination thereof.

In various embodiments, the at least one provisioning parameter comprises a radio parameter, a policy per radio access technology, a parameter per radio access technology, a policy for a long term evolution network, a policy for a new radio network, an access stratum layer configuration, a time validity, a geographical area, a multiple public land mobile network vehicle-to-everything service flag, a multiple public land mobile network vehicle-to-everything service notification, a resource pool configuration per vehicle-to-everything service type, a resource pool configuration per vehicle-to-everything geographical area, a radio parameter for joint utilization per multiple public land mobile network vehicle-to-everything service, a list of available quality indicators per public land mobile network, a quality of service mapping configuration, an allowed public land mobile network list and capabilities for joint radio resource utilization, a public land mobile network priority over joint resources, a service-to-level of automation mapping, a delta parameter, a cause for provisioning adaptation, or some combination thereof. In one embodiment, the at least one provisioning parameter comprises an initial configuration for the plurality of vehicle-to-everything user equipments.

In certain embodiments, the at least one provisioning parameter comprises an updated configuration for the plurality of vehicle-to-everything user equipments. In some embodiments, the updated configuration is triggered by an adaptation of the at least one application requirement, a sidelink communication requirement, or a combination thereof. In various embodiments, the at least one provisioning parameter is provided to at least one application client.

In one embodiment, the at least one provisioning parameter is provided to the at least one communication network via user plane signaling, control plane signaling, or a combination thereof. In certain embodiments, the method 1000 further comprises transmitting the at least one provisioning parameter to a vehicle-to-everything user equipment of the plurality of vehicle-to-everything user equipments. In some embodiments, the method 1000 further comprises performing processing on the at least one application requirement, the at least one provisioning parameter, or a combination thereof.

In one embodiment, a method comprises: obtaining at least one application requirement from at least one vehicle-to-everything application; determining at least one provisioning parameter for a plurality of vehicle-to-everything user equipments based on the at least one application requirement, wherein the plurality of vehicle-to-everything user equipments are serviced by a plurality of communication networks; and transmitting the at least one provisioning parameter to at least one vehicle-to-everything user equipment of the plurality of vehicle-to-everything user equipments, at least one communication network of the plurality of communication networks, or some combination thereof.

In certain embodiments, the at least one application requirement comprises a user equipment identifier, a radio parameter, a policy parameter, a public land mobile network identifier, a multiple public land mobile network vehicle-to-everything service indication, a level of coordination, a level of granularity, a public land mobile network priority, a key performance indicator per vehicle-to-everything session, a quality of service per vehicle-to-everything session, an application-to-service mapping, a service area, a geographical area, assistance information, a service-to-level of automation mapping, or some combination thereof.

In some embodiments, the at least one vehicle-to-everything application comprises a vehicle-to-everything application server, a vehicle-to-everything application client of a vehicle-to-everything user equipment of the plurality of vehicle-to-everything user equipments, or a combination thereof.

In various embodiments, the at least one provisioning parameter comprises a radio parameter, a policy per radio access technology, a parameter per radio access technology, a policy for a long term evolution network, a policy for a new radio network, an access stratum layer configuration, a time validity, a geographical area, a multiple public land mobile network vehicle-to-everything service flag, a multiple public land mobile network vehicle-to-everything service notification, a resource pool configuration per vehicle-to-everything service type, a resource pool configuration per vehicle-to-everything geographical area, a radio parameter for joint utilization per multiple public land mobile network vehicle-to-everything service, a list of available quality indicators per public land mobile network, a quality of service mapping configuration, an allowed public land mobile network list and capabilities for joint radio resource utilization, a public land mobile network priority over joint resources, a service-to-level of automation mapping, a delta parameter, a cause for provisioning adaptation, or some combination thereof.

In one embodiment, the at least one provisioning parameter comprises an initial configuration for the plurality of vehicle-to-everything user equipments.

In certain embodiments, the at least one provisioning parameter comprises an updated configuration for the plurality of vehicle-to-everything user equipments.

In some embodiments, the updated configuration is triggered by an adaptation of the at least one application requirement, a sidelink communication requirement, or a combination thereof.

In various embodiments, the at least one provisioning parameter is provided to at least one application client of the at least one vehicle-to-everything user equipment.

In one embodiment, the at least one provisioning parameter is provided to the at least one communication network via user plane signaling, control plane signaling, or a combination thereof.

In certain embodiments, the method further comprises transmitting a notification to the at least one vehicle-to-everything application as feedback corresponding to the at least one application requirement.

In one embodiment, an apparatus comprises: a processor that: obtains at least one application requirement from at least one vehicle-to-everything application; and determines at least one provisioning parameter for a plurality of vehicle-to-everything user equipments based on the at least one application requirement, wherein the plurality of vehicle-to-everything user equipments are serviced by a plurality of communication networks; and a transmitter that transmits the at least one provisioning parameter to at least one vehicle-to-everything user equipment of the plurality of vehicle-to-everything user equipments, at least one communication network of the plurality of communication networks, or some combination thereof.

In certain embodiments, the at least one application requirement comprises a user equipment identifier, a radio parameter, a policy parameter, a public land mobile network identifier, a multiple public land mobile network vehicle-to-everything service indication, a level of coordination, a level of granularity, a public land mobile network priority, a key performance indicator per vehicle-to-everything session, a quality of service per vehicle-to-everything session, an application to service mapping, a service area, a geographical area, assistance information, a service to level of automation mapping, or some combination thereof.

In some embodiments, the at least one vehicle-to-everything application comprises a vehicle-to-everything application server, a vehicle-to-everything application client of a vehicle-to-everything user equipment of the plurality of vehicle-to-everything user equipments, or a combination thereof.

In various embodiments, the at least one provisioning parameter comprises a radio parameter, a policy per radio access technology, a parameter per radio access technology, a policy for a long term evolution network, a policy for a new radio network, an access stratum layer configuration, a time validity, a geographical area, a multiple public land mobile network vehicle-to-everything service flag, a multiple public land mobile network vehicle-to-everything service notification, a resource pool configuration per vehicle-to-everything service type, a resource pool configuration per vehicle-to-everything geographical area, a radio parameter for joint utilization per multiple public land mobile network vehicle-to-everything service, a list of available quality indicators per public land mobile network, a quality of service mapping configuration, an allowed public land mobile network list and capabilities for joint radio resource utilization, a public land mobile network priority over joint resources, a service to level of automation mapping, a delta parameter, a cause for provisioning adaptation, or some combination thereof.

In one embodiment, the at least one provisioning parameter comprises an initial configuration for the plurality of vehicle-to-everything user equipments.

In certain embodiments, the at least one provisioning parameter comprises an updated configuration for the plurality of vehicle-to-everything user equipments.

In some embodiments, the updated configuration is triggered by an adaptation of the at least one application requirement, a sidelink communication requirement, or a combination thereof.

In various embodiments, the at least one provisioning parameter is provided to at least one application client of the at least one vehicle-to-everything user equipment.

In one embodiment, the at least one provisioning parameter is provided to the at least one communication network via user plane signaling, control plane signaling, or a combination thereof.

In certain embodiments, the transmitter transmits a notification to the at least one vehicle-to-everything application as feedback corresponding to the at least one application requirement.

In one embodiment, a method comprises: receiving at least one application requirement from at least one vehicle-to-everything application; and receiving at least one provisioning parameter, wherein the at least one provisioning parameter is determined for a plurality of vehicle-to-everything user equipments based on the at least one application requirement, and the plurality of vehicle-to-everything user equipments are serviced by a plurality of communication networks.

In certain embodiments, the at least one application requirement comprises a user equipment identifier, a radio parameter, a policy parameter, a public land mobile network identifier, a multiple public land mobile network vehicle-to-everything service indication, a level of coordination, a level of granularity, a public land mobile network priority, a key performance indicator per vehicle-to-everything session, a quality of service per vehicle-to-everything session, an application to service mapping, a service area, a geographical area, assistance information, a service to level of automation mapping, or some combination thereof.

In some embodiments, the at least one vehicle-to-everything application comprises a vehicle-to-everything application server, a vehicle-to-everything application client of a vehicle-to-everything user equipment of the plurality of vehicle-to-everything user equipments, or a combination thereof.

In various embodiments, the at least one provisioning parameter comprises a radio parameter, a policy per radio access technology, a parameter per radio access technology, a policy for a long term evolution network, a policy for a new radio network, an access stratum layer configuration, a time validity, a geographical area, a multiple public land mobile network vehicle-to-everything service flag, a multiple public land mobile network vehicle-to-everything service notification, a resource pool configuration per vehicle-to-everything service type, a resource pool configuration per vehicle-to-everything geographical area, a radio parameter for joint utilization per multiple public land mobile network vehicle-to-everything service, a list of available quality indicators per public land mobile network, a quality of service mapping configuration, an allowed public land mobile network list and capabilities for joint radio resource utilization, a public land mobile network priority over joint resources, a service-to-level of automation mapping, a delta parameter, a cause for provisioning adaptation, or some combination thereof.

In one embodiment, the at least one provisioning parameter comprises an initial configuration for the plurality of vehicle-to-everything user equipments.

In certain embodiments, the at least one provisioning parameter comprises an updated configuration for the plurality of vehicle-to-everything user equipments.

In some embodiments, the updated configuration is triggered by an adaptation of the at least one application requirement, a sidelink communication requirement, or a combination thereof.

In various embodiments, the at least one provisioning parameter is provided to at least one application client.

In one embodiment, the at least one provisioning parameter is provided to the at least one communication network via user plane signaling, control plane signaling, or a combination thereof.

In certain embodiments, the method further comprises transmitting the at least one provisioning parameter to a vehicle-to-everything user equipment of the plurality of vehicle-to-everything user equipments.

In some embodiments, the method further comprises performing processing on the at least one application requirement, the at least one provisioning parameter, or a combination thereof.

In one embodiment, an apparatus comprises: a receiver that: receives at least one application requirement from at least one vehicle-to-everything application; and receives at least one provisioning parameter, wherein the at least one provisioning parameter is determined for a plurality of vehicle-to-everything user equipments based on the at least one application requirement, and the plurality of vehicle-to-everything user equipments are serviced by a plurality of communication networks.

In certain embodiments, the at least one application requirement comprises a user equipment identifier, a radio parameter, a policy parameter, a public land mobile network identifier, a multiple public land mobile network vehicle-to-everything service indication, a level of coordination, a level of granularity, a public land mobile network priority, a key performance indicator per vehicle-to-everything session, a quality of service per vehicle-to-everything session, an application to service mapping, a service area, a geographical area, assistance information, a service to level of automation mapping, or some combination thereof.

In some embodiments, the at least one vehicle-to-everything application comprises a vehicle-to-everything application server, a vehicle-to-everything application client of a vehicle-to-everything user equipment of the plurality of vehicle-to-everything user equipments, or a combination thereof.

In various embodiments, the at least one provisioning parameter comprises a radio parameter, a policy per radio access technology, a parameter per radio access technology, a policy for a long term evolution network, a policy for a new radio network, an access stratum layer configuration, a time validity, a geographical area, a multiple public land mobile network vehicle-to-everything service flag, a multiple public land mobile network vehicle-to-everything service notification, a resource pool configuration per vehicle-to-everything service type, a resource pool configuration per vehicle-to-everything geographical area, a radio parameter for joint utilization per multiple public land mobile network vehicle-to-everything service, a list of available quality indicators per public land mobile network, a quality of service mapping configuration, an allowed public land mobile network list and capabilities for joint radio resource utilization, a public land mobile network priority over joint resources, a service to level of automation mapping, a delta parameter, a cause for provisioning adaptation, or some combination thereof.

In one embodiment, the at least one provisioning parameter comprises an initial configuration for the plurality of vehicle-to-everything user equipments.

In certain embodiments, the at least one provisioning parameter comprises an updated configuration for the plurality of vehicle-to-everything user equipments.

In some embodiments, the updated configuration is triggered by an adaptation of the at least one application requirement, a sidelink communication requirement, or a combination thereof.

In various embodiments, the at least one provisioning parameter is provided to at least one application client.

In one embodiment, the at least one provisioning parameter is provided to the at least one communication network via user plane signaling, control plane signaling, or a combination thereof.

In certain embodiments, the apparatus further comprises a transmitter that transmits the at least one provisioning parameter to a vehicle-to-everything user equipment of the plurality of vehicle-to-everything user equipments.

In some embodiments, the apparatus further comprises a processor that performs processing on the at least one application requirement, the at least one provisioning parameter, or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a device, the method comprising:

obtaining a set of application requirements from at least one vehicle-to-everything (V2X) application, wherein the set of application requirements comprises a key performance indicator per V2X session and an application-to-service mapping;

determining a set of provisioning parameters for a plurality of V2X user equipments (UEs) based on the set of application requirements, wherein the plurality of V2X UEs are associated with a plurality of public land mobile networks (PLMNs), wherein the set of provisioning parameters comprises a policy per radio access technology, a radio parameter for joint utilization per multiple PLMN V2X service, and a quality of service mapping configuration; and transmitting the set of provisioning parameters to at least one V2X UE of the plurality of V2X UEs.

2. The method of claim 1, wherein the set of application requirements further comprises a UE identifier, a radio parameter, a policy parameter, a public land mobile network identifier, a multiple public land mobile network V2X service indication, a level of coordination, a level of granularity, a public land mobile network priority, a quality of service per V2X session, a service area, a geographical area, assistance information, a service-to-level of automation mapping, or a combination thereof, wherein the set of provisioning parameters further comprises a parameter per radio access technology, a multiple public land mobile network V2X service flag, an access stratum layer configuration, a multiple public land mobile network V2X service notification, a resource pool configuration per V2X service type, a resource pool configuration per V2X geographical area, a cause for provisioning adaptation, or a combination thereof, and wherein the policy per radio access technology comprises a policy for a long term evolution network, a policy for a new radio network, or a combination thereof.

3. The method of claim 1, wherein the at least one V2X application comprises a V2X application server, a V2X application client of a V2X UE of the plurality of V2X UEs, or a combination thereof.

4. The method of claim 1, wherein at least one provisioning parameter of the set of provisioning parameters comprises an initial configuration for the plurality of V2X UEs.

5. The method of claim 1, wherein at least one provisioning parameter of the set of provisioning parameters comprises an updated configuration for the plurality of V2X UEs.

6. The method of claim 5, wherein the updated configuration is triggered by an adaptation of the set of application requirements, a sidelink communication requirement, or a combination thereof.

7. The method of claim 1, wherein at least one provisioning parameter of the set of provisioning parameters is provided to at least one application client of the at least one V2X UE.

8. The method of claim 1, wherein at least one provisioning parameter of the set of provisioning parameters is provided to the PLMN via user plane signaling, control plane signaling, or a combination thereof.

9. The method of claim 1, further comprising transmitting a notification to the at least one V2X application as feedback corresponding to the set of provisioning parameters.

10. An apparatus for wireless communication, the apparatus comprising:

at least one memory; and at least one processor coupled with the at least one memory and configured to cause the apparatus to:

obtain a set of application requirements from at least one vehicle-to-everything (V2X) application, wherein the set of application requirements comprises a key performance indicator per V2X session and an application-to-service mapping;

determine a set of provisioning parameters for a plurality of V2X user equipments (UEs) based on the set of application requirements, wherein the plurality of V2X UEs are associated with a plurality of public land mobile networks (PLMNs), wherein the set of provisioning parameters comprises a policy per radio access technology, a radio parameter for joint utilization per multiple PLMN V2X service, and a quality of service mapping configuration; and transmit the set of provisioning parameters to at least one V2X UE of the plurality of V2X UEs.

11. The apparatus of claim 10, wherein the set of application requirements further comprises a UE identifier, a radio parameter, a policy parameter, a public land mobile network identifier, a multiple public land mobile network V2X service indication, a level of coordination, a level of granularity, a public land mobile network priority, a quality of service per V2X session, a service area, a geographical area, assistance information, a service to level of automation mapping, or a combination thereof, wherein the set of provisioning parameters further comprises a parameter per radio access technology, a multiple public land mobile network V2X service flag, an access stratum layer configuration, a multiple public land mobile network V2X service notification, a resource pool configuration per V2X service type, a resource pool configuration per V2X geographical area, a cause for provisioning adaptation, or a combination thereof, and wherein the wherein the policy per radio access technology comprises a policy for a long term evolution network, a policy for a new radio network, or a combination thereof.

12. The apparatus of claim 10, wherein the at least one V2X application comprises a V2X application server, a V2X application client of a V2X UE of the plurality of V2X UEs, or a combination thereof.

13. The apparatus of claim 10, wherein at least one provisioning parameter of the set of provisioning parameters comprises an initial configuration for the plurality of V2X UEs.

14. The apparatus of claim 10, wherein at least one provisioning parameter of the set of provisioning parameters comprises an updated configuration for the plurality of V2X UEs.

15. The apparatus of claim 14, wherein the updated configuration is triggered by an adaptation of the set of application requirements, a sidelink communication requirement, or a combination thereof.

16. The apparatus of claim 10, wherein at least one provisioning parameter of the set of provisioning parameters is provided to at least one application client of the at least one V2X UE.

17. The apparatus of claim 10, wherein at least one provisioning parameter of the set of provisioning parameters is provided to the PLMN via user plane signaling, control plane signaling, or a combination thereof.

18. The apparatus of claim 10, wherein the at least one processor is configured to cause the apparatus to a notification to the at least one V2X application as feedback corresponding to the set of provisioning parameters.

* * * * *